United States Patent
Mei et al.

(10) Patent No.: US 11,481,589 B2
(45) Date of Patent: Oct. 25, 2022

(54) ONEPASS SYSTEM INKJET PRINTING CONTROL METHOD, DEVICE AND STORAGE MEDIUM

(71) Applicant: SHENZHEN HOSONSOFT CO., LTD, Guangdong (CN)

(72) Inventors: Ming Mei, Guangdong (CN); Yan Chen, Guangdong (CN); Liqun Zeng, Guangdong (CN); Shubo Su, Guangdong (CN); Zhongkun Huang, Guangdong (CN)

(73) Assignee: SHENZHEN HOSONSOFT CO., LTD, Guangdong (CN)

( * ) Notice: Subject to any disclaimer, the term of this patent is extended or adjusted under 35 U.S.C. 154(b) by 0 days.

(21) Appl. No.: 17/312,944

(22) PCT Filed: Dec. 27, 2019

(86) PCT No.: PCT/CN2019/128946
§ 371 (c)(1),
(2) Date: Jun. 11, 2021

(87) PCT Pub. No.: WO2020/135649
PCT Pub. Date: Jul. 2, 2020

(65) Prior Publication Data
US 2022/0067464 A1    Mar. 3, 2022

(30) Foreign Application Priority Data

Dec. 29, 2018  (CN) .......................... 201811638262.5
Dec. 29, 2018  (CN) .......................... 201811638330.8

(Continued)

(51) Int. Cl.
*G06K 15/02* (2006.01)
*G06K 15/10* (2006.01)
(Continued)

(52) U.S. Cl.
CPC ....... *G06K 15/1898* (2013.01); *G06K 15/102* (2013.01); *G06K 15/408* (2013.01); *B41J 3/543* (2013.01)

(58) Field of Classification Search
CPC .................................................. G06K 15/1898
(Continued)

(56) References Cited

FOREIGN PATENT DOCUMENTS

| CN | 109002267 A | * | 12/2018 | ........... G06F 3/1215 |
| CN | 109605954 A | * | 4/2019 | ................ B41J 2/11 |

* cited by examiner

*Primary Examiner* — Jacky X Zheng

(57) ABSTRACT

A Onepass system inkjet printing control method, device and storage are provided. The method includes: dividing all physical channels into several groups according to a printing requirement command, defining one group as a printing module, wherein each of the printing modules includes x physical channels, $x \geq 1$, x is an integer; configuring n logical channels for each printing module, wherein $n \geq x$, n is an integer; starting a printing command, and extracting corresponding printing data from the printing memory in units of the logical channel; processing the printing data according to the printing parameters and then inputting it into the corresponding physical channel for inkjet printing. The solution of the present invention ensures that each printing module can independently control the printing task during printing.

21 Claims, 13 Drawing Sheets

(30) Foreign Application Priority Data

| Dec. 29, 2018 | (CN) | ......................... 201811638358.1 |
| Dec. 29, 2018 | (CN) | ......................... 201811643921.4 |
| Jan. 17, 2019 | (CN) | ......................... 201910044195.2 |
| May 25, 2019 | (CN) | ......................... 201910442370.3 |
| May 25, 2019 | (CN) | ......................... 201910442375.6 |
| Jul. 2, 2019 | (CN) | ......................... 201910591384.1 |

(51) Int. Cl.
*G06K 15/00* (2006.01)
*B41J 3/54* (2006.01)

(58) Field of Classification Search
USPC .......................................................... 358/1.1
See application file for complete search history.

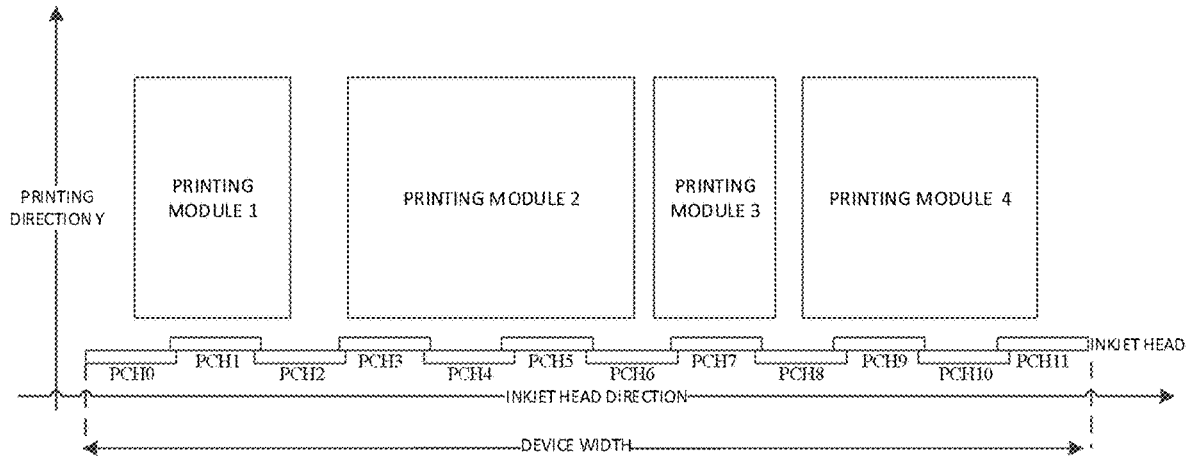

FIG. 3

| confirming shared physical channels and dedicated physical channels among all physical channels according to the printing requirement, wherein the shared physical channel belongs to y printing modules, and the dedicated physical channel belongs to only one printing module, y≥2, y is an integer | — S211 |

| configuring m logical channels for each shared physical channel, configuring z logical channels for each dedicated physical channel, wherein m≥y, z≥1, m and z are integers | — S212 |

FIG. 4

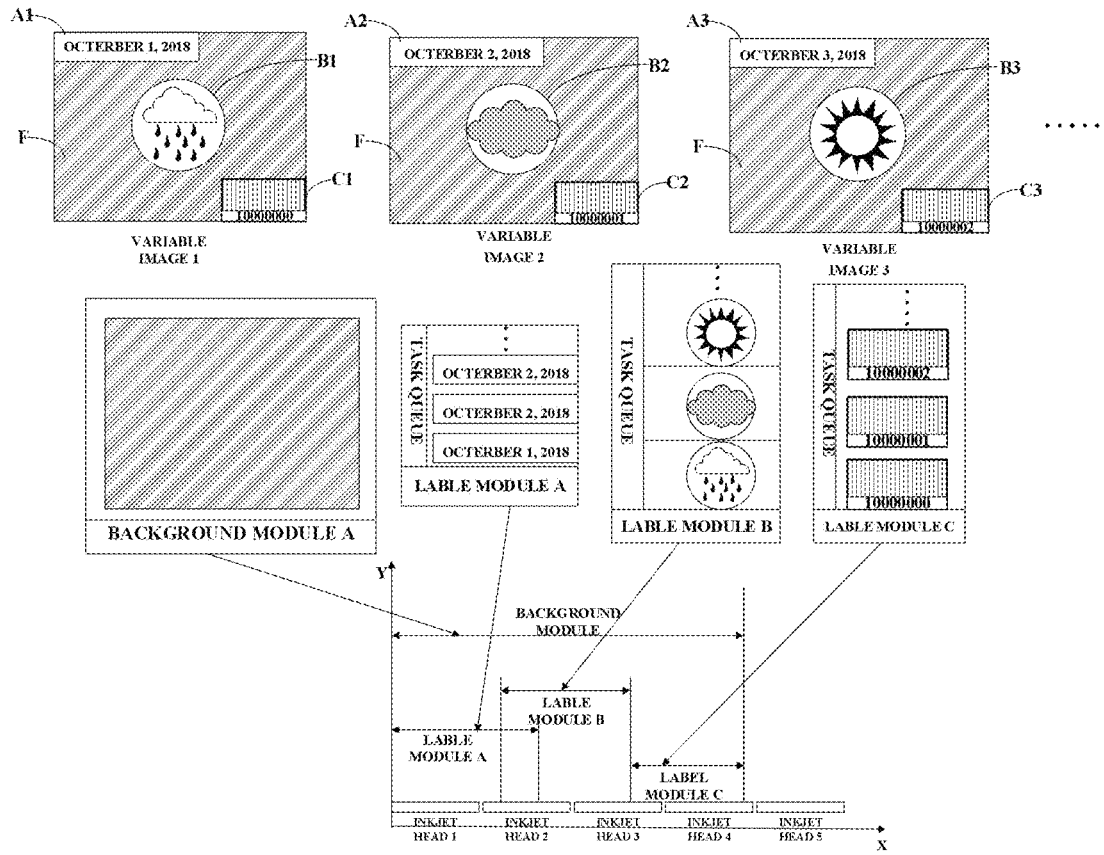

FIG. 14 configuring n logical channels for each of the label modules, and one logical channel in each of the label modules corresponding to one physical channel in the label module — S221 configuring m logical channels for each of the background modules, and one logical channel in each of the background modules corresponding to one physical channel in the background module — S222 establishing a mapping relationship between the physical channels, the logical channels, and the printing modules — S223

FIG. 15

| a0 | a1 | a2 | a3 | a4 | a5 | a6 | a7 |
| b0 | b1 | b2 | b3 | b4 | b5 | b6 | b7 |
| c0 | c1 | c2 | c3 | c4 | c5 | c6 | c7 |
| d0 | d1 | d2 | d3 | d4 | d5 | d6 | d7 |
| e0 | e1 | e2 | e3 | e4 | e5 | e6 | e7 |
| f0 | f1 | f2 | f3 | f4 | f5 | f6 | f7 |

ONEPASS SYSTEM INKJET PRINTING CONTROL METHOD, DEVICE AND STORAGE MEDIUM

CROSS REFERENCE OF RELATED APPLICATION

The present invention claims priority under 35 U.S.C. 119 (a-d) to CN 201811638262.5, filed Dec. 29, 2018.
The present invention claims priority under 35 U.S.C. 119 (a-d) to CN 201910442375.6, filed May 25, 2019.
The present invention claims priority under 35 U.S.C. 119 (a-d) to CN 201910591384.1, filed Jul. 2, 2019.
The present invention claims priority under 35 U.S.C. 119 (a-d) to CN 201811638330.8, filed Dec. 29, 2018.
The present invention claims priority under 35 U.S.C. 119 (a-d) to CN 201910442370.3, filed May 25, 2019.
The present invention claims priority under 35 U.S.C. 119 (a-d) to CN 201910044195.2, filed Jan. 17, 2019.
The present invention claims priority under 35 U.S.C. 119 (a-d) to CN 201811643921.4, filed Dec. 29, 2018.
The present invention claims priority under 35 U.S.C. 119 (a-d) to CN 201811638358.1, filed Dec. 29, 2018.

FIELD OF INVENTION

The present invention generally relates to digital printing technology, and in particular to a Onepass system inkjet printing control method, device and storage medium.

DESCRIPTION OF RELATED ARTS

With the widespread application of computers in graphics or word processing, the application of printers has become more and more common. Through the printer, people can easily output text or graphics in the computer to pictures. Conventionally, inkjet printing methods are mainly divided into multi-pass printing and one-pass printing. The characteristic of multi-pass printing is that the nozzle length direction of the inkjet head is parallel to the Y-direction of the movement direction of the print medium, and the inkjet head reciprocates in the X-direction, the print medium moves in a stepping manner, the inkjet head moves a stroke in the X-direction and completes the printing of one pass, the print medium moves by a distance of one pass during the intermittent period of inkjet head reversing and speed increasing, the printing of the next pass is completed after the inkjet head is reversed, and all the printing operations are completed by repeating the above operations, the pattern at the same position of the print medium needs to be divided into multiple passes to complete. The multi-pass printing has low efficiency and small output, but its price is low, which is suitable for small batch, intermittent production. The Onepass printing means that the length direction (X-direction) of the nozzle of the inkjet head is perpendicular to the movement direction (Y-direction) of the print medium. The inkjet head is generally fixed, and the print medium can pass through the inkjet head once to obtain the pattern to be printed, and the print medium moves continuously without pause. The Onepass printing has the advantages of high efficiency and large output, and is suitable for mass, continuous production.

Technical Problem

Referring to FIG. 1, the conventional Onepass printing device is composed of a row of inkjet heads spliced from end to end, when the width of the product along the direction of the inkjet head is equal to the sum of the width of all inkjet heads, the utilization rate of the inkjet head can reach almost 100% in one printing; however, when the width of the product along the direction of the inkjet head is very small, for example, the width of the product along the direction of the inkjet head is equal to the width of one inkjet head, at this time, only one inkjet head ejects ink, and the other inkjet heads do not eject ink, so that the utilization rate of the inkjet heads during printing is low, and the waste of resources is serious; if one row of inkjet heads of the Onepass printing device is divided into multiple production lines, as shown in FIG. 1, each printing module prints an independent printing task every time it prints, at this time, almost every inkjet head will eject ink, which can greatly improve the utilization rate of the inkjet head and at the same time increase the productivity of the product, wherein each printing module can discharge ink at the same time or at different times, each production line is independent of each other, how to ensure that each printing module supports independently controlled printing tasks during printing is an urgent problem for Onepass multi-production line printing.

SUMMARY OF THE PRESENT INVENTION

The present invention provides a Onepass system inkjet printing control method, device and storage medium for solving the problem mentioned above.

In one aspect, the present invention provides a Onepass system inkjet printing control method, comprising steps of:

dividing all physical channels into several groups according to a printing requirement command, defining the several groups as printing modules, wherein each of printing modules comprises x physical channels, $x \geq 1$, x is an integer;

configuring n logical channels for the printing modules, wherein $n \geq x$, n is an integer;

starting a printing command, and extracting corresponding printing data from a printing memory in units of the logical channel; and processing the printing data according to printing parameters and then inputting processed printing data into a corresponding physical channel for inkjet printing;

wherein each of the physical channels corresponds to an inkjet head or y rows of nozzles on a corresponding inkjet head, $y \geq 1$, and the printing parameters are generated according to the printing requirement command and characteristics of a printing device.

In an embodiment, the printing requirement command further comprises a command for a number of copies of a product to be printed;

after configuring n logical channels for the printing modules, the method further comprises steps of:

according to the command for the number of copies of the product to be printed, generating a printing task queue, wherein one of the printing modules corresponds to one printing task queue;

acquiring target printing tasks and printing parameters from the printing task queue corresponding to each of the printing modules;

storing the target printing tasks of each of the printing modules in corresponding storage areas in a task processing buffer; and establishing a mapping relationship among the physical channels, the logical channels, the printing modules, and the storage areas according to the printing requirement command.

In an embodiment, the step of starting the printing command further comprises steps of:

starting the printing command, extracting the target printing task corresponding to each of the printing modules; and calculating a storage address of the printing data corresponding to a logical channel of a current ignition according to the printing parameters of the target printing task, and extracting the corresponding printing data from the printing memory according to the storage address.

In an embodiment, the step of extracting the corresponding printing data from the printing memory further comprises steps of:

acquiring a logical channel number and a logical channel parameter of the logical channel of the current ignition;

acquiring a printing task number of the target printing task, and acquiring a task parameter corresponding to the target printing task and a printing position of the target printing task according to the printing task number;

acquiring a storage address and a printing parameter of channel data corresponding to the logical channel according to the logical channel parameter, the task parameter corresponding to the target printing task, and the printing position; and extracting the channel data from the printing memory according to the storage address, and processing the channel data and the printing parameter to obtain the printing data.

In an embodiment, the step of acquiring the storage address and the printing parameter of the channel data corresponding to the logical channel further comprises steps of:

acquiring an actual storage address of the channel data corresponding to the logical channel according to the logical channel parameter;

determining a requirement reading address of the channel data corresponding to the logical channel according to the task parameter and a memory addressing requirement of the target printing task;

determining invalid data in the channel data to be read according to the actual storage address and the requirement reading address; and reading the channel data, removing the invalid data and writing the channel data into a data buffer.

In an embodiment, the step of configuring n logical channels comprises steps of:

confirming shared physical channels and dedicated physical channels among all the physical channels according to printing requirements, wherein the shared physical channel belongs to y printing modules, and the dedicated physical channel belongs to only one printing module, y≥2, y is an integer; and configuring m logical channels for each of the shared physical channels, configuring z logical channels for each of the dedicated physical channels, wherein m≥y, z≥1, m and z are integers.

In an embodiment, the step of processing the printing data according to the printing parameters and then inputting the processed printing data into the corresponding physical channel for inkjet printing further comprises steps of:

merging the printing data corresponding to all the logical channels in each of the shared physical channels according to the printing parameters, and then processing and inputting the printing data into the shared physical channels for ejecting ink; and directly processing the printing data corresponding to a logical channel of each of the dedicated physical channels and inputting the printing data into the dedicated physical channels for inkjet printing according to the printing parameters.

In an embodiment, the method further comprises steps of: setting "a" label images in a variable image, wherein "a" is an integer and a≥1, and the "a" label images are distributed in different positions of a background image according to a predetermined typesetting rule, the step of dividing all the physical channels into the several groups according to the printing requirement command comprises steps of:

determining a physical channel for printing each of the label images according to the printing requirement command, defining all the physical channels corresponding to one label image as a label module, wherein the label module comprises x1 physical channels, x1 is an integer and x1≥1; and determining a physical channel for printing the background image according to the printing requirement command, defining all the physical channels corresponding to the background image as a background module, wherein the background module comprises x2 physical channels, x2 is an integer and x2≥x1.

In an embodiment, the printing requirement command comprises: a printing start command and a task parameter, the printing start command comprises a command for a number of copies of the variable image to be printed and a command for selecting the background image, the task parameter is obtained according to the predetermined typesetting rule, and the task parameter comprises: a width of each of the label images and the background image along a direction in which the inkjet heads are arranged.

In an embodiment, the method further comprises:

configuring x1 logical channels for each of the label modules, wherein one logical channel in each of the label modules corresponds to one physical channel in the label modules;

configuring x2 logical channels for the background module, wherein one logical channel in the background module corresponds to one physical channel in the background module; and establishing a mapping relationship between the physical channels, the logical channels, and the printing modules.

In an embodiment, the method further comprises steps of:

respectively acquiring background image data and label image data required for current printing in units of one logical channel;

merging the background image data of the logical channel corresponding to a same physical channel and the label image data required for the current printing according to the mapping relationship; and subjecting merged background image data and label image data to inkjet printing.

In an embodiment, the method further comprises steps of:

respectively acquiring background image data and label image data required for current printing in units of one logical channel;

merging the background image data of the logical channel corresponding to a same physical channel and the label image data required for the current printing according to the mapping relationship; and subjecting merged background image data and label image data to inkjet printing.

In an embodiment, the method further comprises steps of:

acquiring a printing trigger signal of the background module, and judging whether the printing task queue corresponding to the background module and all the label modules are empty according to the printing trigger signal;

when the printing task queue corresponding to the background module and all the label modules are not empty, determining whether the task parameter of a current printing task in each printing task queue are read incorrectly; and when the task parameter of the background module and all the label modules are correctly read, controlling the background module and all the label modules to simultaneously create the current printing task.

In an embodiment, the printing task queue of the background module comprises a starting address of the background image data in a memory, and a number of times the background image needs to be repeatedly printed; the printing task queue of each of the label modules comprises a starting address of the label image data acquired each time in the memory and a data length of each printing task.

In an embodiment, the step of processing the printing data according to the printing parameters and then inputting the processed printing data into the corresponding physical channel for inkjet printing comprises steps of:

acquiring a first count value after counting a movement distance of a print medium;

comparing whether the first count value is equal to a set value of a printing start position;

when the first count value is less than the set value of the printing start position, continuing to count the movement distance of the print medium until the first count value is equal to the set value of the printing start position;

acquiring a second count value after counting a number of print lines of the current printing task;

comparing whether a channel offset value of each logical channel is less than or equal to the second count value;

when the channel offset value of the logical channel is less than or equal to the second count value, executing printing of the current printing task by the logical channel, otherwise, not executing the printing of the current printing task by the logical channel; and repeatedly comparing whether the channel offset value of each logical channel is less than or equal to the second count value, until the printing of the current printing task is completed.

In an embodiment, the step of when the channel offset value of the logical channel is less than or equal to the second count value, executing the printing of the current printing task by the logical channel, otherwise, not executing the printing of the current printing task by the logical channel comprises steps of:

when the channel offset value of the logical channel is less than or equal to the second count value, the printing data extracted from a storage medium in units of the logical channel is valid data, then the physical channel corresponding to the logical channel performs inkjet printing according to the valid data; and when the channel offset value of the logical channel is greater than the second count value, the printing data extracted from the storage medium in units of the logical channel is invalid data, then the physical channel corresponding to the logical channel does not eject ink.

In an embodiment, the method further comprises steps of:

when the channel offset value of the logical channel is greater than the second count value, extracting printing data from a storage medium in units of the logical channel and performing shielding processing to obtain invalid data;

storing the invalid data in a RAM buffer corresponding to the logical channel;

and according to a mapping relationship, extracting the invalid data from the RAM buffer to the physical channel for printing, wherein when the printing data is invalid data, the physical channel does not eject ink during the printing process.

In an embodiment, the method further comprises steps of:

acquiring an actual arrangement rule of the physical channels in the current printing task;

calculating to obtain offset values of each physical channel according to the actual arrangement rule; and acquiring the channel offset value corresponding to each logical channel according to the mapping relationship, wherein the channel offset values of all the logical channels corresponding to one physical channel are the same and equal to the offset value of the physical channel.

In an embodiment, the step of acquiring a second count value after counting a number of print lines of the current printing task further comprises steps of:

acquiring a printing accuracy of the current printing task;

acquiring an ignition signal of each row of pixels printed by the current printing task according to the print accuracy; and counting according to the ignition signal, and increasing the second count value by 1 for each ignition.

In an embodiment, the step of comparing whether the first count value is equal to the set value of the printing start position further comprises steps of:

calculating to obtain the set value of the printing start position according to the printing accuracy and a margin distance parameter;

calculating to obtain a counting signal according to the printing accuracy; and counting according to the counting signal, then increasing the first count value by 1 each time the counting signal is generated.

According to a second aspect, the present invention provides a Onepass system inkjet printing control device, comprising:

at least one processor, at least one memory, and computer program instructions stored in a memory, which implement the above method when the computer program instructions are executed by the processor.

According to a third aspect, the present invention provides a storage medium having computer program instructions stored thereon, wherein the method as defined in the first aspect is implemented when the computer program instructions are executed by a processor.

Beneficial Effect

By dividing all physical channels into several groups according to the printing requirement command, defining each group as a printing module, configuring n logical channels for each printing module, then using the logical channel as a bridge to extract and process data, the Onepass system inkjet printing control method, device and storage medium provided in the present invention ensure that each printing module can independently control the corresponding printing task and can accurately print on the predetermined position.

BRIEF DESCRIPTION OF THE DRAWINGS

In order to explain the technical solutions of the embodiments of the present application more clearly, the following will briefly introduce the drawings that need to be used in the embodiments of the present invention. For those of ordinary skill in the art, other drawings can be obtained based on these drawings without creative work.

FIG. 3 is a schematic diagram showing the distribution of printing modules of the Onepass system inkjet printing control method according to a preferred embodiment of the present invention;

FIG. 4 is a flow chart of channel determination of the inkjet printing control method of the Onepass system according to a preferred embodiment of the present invention;

FIG. 14 is a schematic diagram of module allocation of the Onepass system inkjet printing control method according to the first embodiment of the present invention;

FIG. 15 is a flowchart of a logical channel allocation method in the Onepass system inkjet printing control method according to the first embodiment of the present invention;

DETAILED DESCRIPTION

Features and exemplary embodiments of various aspects of the present invention will be described in below. In order to make the objectives, technical solutions, and advantages of the present invention clearer, the present invention will be further illustrated with reference to the accompanying drawings and embodiments. It should be understood that the specific embodiments described herein are only to explain the present invention, not to limit. For those skilled in the art, the present invention may be implemented without some of these specific details. The following description of the embodiments is merely to provide a better understanding of the present invention by showing examples thereof.

It should be noted that, in this specification, terms like "first" and "second" are only used to differentiate one entity or operation from another, but are not necessarily used to indicate any practical relationship or order between these entities or operations. Moreover, terms such as "include", "contain" or any variation of the term means "including but not limited to". Therefore, a process, method, object, or device that includes a series of elements not only includes these elements, but also includes other elements that are not specified expressly, or may further include inherent elements of the process, method, object or device. In the case that there are no more limitations, in the context of an element that is specified by "include one . . . ", the process, method, object or device that includes a specified element may include other identical elements.

Figure 1:
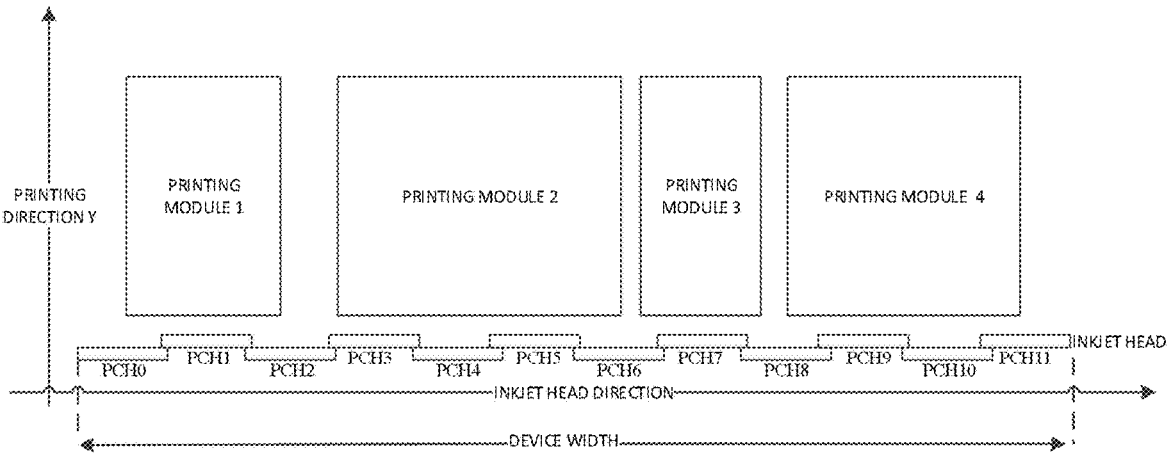
FIG. 1 is a schematic diagram of the inkjet head structure of the Onepass printing device.
Figure 2:
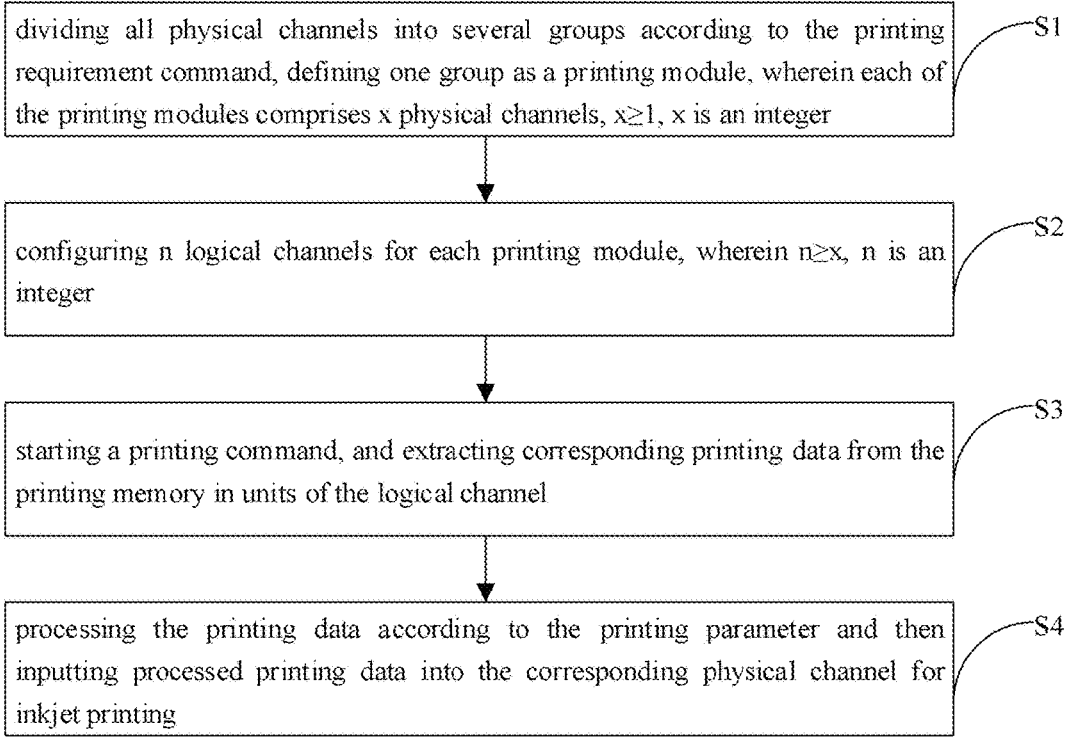
FIG. 2 is an overall flow chart of the Onepass system inkjet printing control method according to a preferred embodiment of the present invention.

Referring to FIG. 2, the present invention provides a Onepass system inkjet printing control method, which divides all physical channels into several groups according to the printing requirement command, defines one group as a printing module, configures n logical channels for each printing module, and then uses logical channels as bridge to perform data extraction and processing, so as to ensure that each printing module can independently control the corresponding printing task and can accurately print on the predetermined position. The method comprises steps as follows:

S1) dividing all physical channels into several groups according to the printing requirement command, defining one group as a printing module, wherein each of the printing modules comprises x physical channels, x≥1, x is an integer;

S2) configuring n logical channels for each printing module, wherein n≥x, n is an integer;

S3) starting a printing command, and extracting corresponding printing data from the printing memory by in units of the logical channel; and S4) processing the printing data according to the printing parameter and then inputting processed printing data into the corresponding physical channel for inkjet printing.

Specifically, all physical channels are divided into several groups according to the printing requirement command input by the customer, and one group is defined as a printing module, wherein each printing module comprises x physical channels, x≥1, x is an integer, when one of the printing modules only occupies half of a certain physical channel, it is treated as a physical channel in the present invention, if one printing module actually occupies 3 and a half physical channels, the printing module in the present invention comprises 4 physical channels; n logical channels are configured for each printing module, wherein the number of logical channels owned by each printing module can be the same as the number of physical channels owned by it, at this time, one physical channel corresponds to one logical channel, after establishing the correspondence between the printing module, logical channel, and physical channel, then the corresponding printing data extracted from the printing memory in units of logical channel can be processed and input into the corresponding physical channel in the corresponding printing module. When the number of logical channels owned by each printing module is greater than the number of physical channels owned by it, there must be a certain physical channel corresponding to multiple logical channels or a logical channel that does not correspond to a physical channel, when a physical channel corresponds to multiple logical channels, after extracting the corresponding printing data from the printing memory in units of the logical channel, the printing data corresponding to all the logical channels in the physical channel are merged, and then it is processed and input into the physical channel according to the printing parameter; when a logical channel does not have a corresponding physical channel, the logical channel does not perform any operation. The printing parameter is generated according to the printing requirement command and the characteristics of the printing device, which specifically comprises a series of printing-related parameters such as the number of nozzles corresponding to the physical channel, the maximum number of channels, the last channel number in each printing module and the channel control parameters, the physical channels comprised in each printing module can be located in one Onepass printing device or multiple Onepass printing devices, and the specific circumstances are not limited here.

Referring to FIG. 3, in this embodiment, each printing module is located in the same Onepass printing device, one inkjet head corresponds to one physical channel, the number of physical channels is equal to the number of logical channels, one physical channel corresponds to one logical channel, no two printing modules share one physical channel, the printing device comprises a total of 12 inkjet heads and 12 physical channels, each physical channel is numbered with a certain end of the inkjet head arrangement direction (X-axis direction) as the starting point, the direction perpendicular to the inkjet head arrangement is the printing direction (Y-axis direction), the leftmost end is used as the starting point in this embodiment, the number of each physical channel ranges from PCH0 to PCH11, PCH0 represents the first physical channel, PCH1 represents the second physical channel, PCH3 represents the third physical channel and so on. According to the number of the physical channels, 12 logical channels are allocated, and the 12 logical channels are numbered from LCH0 to LCH11, LCH0 represents the first logical channel, LCH1 represents the second logical channel and so on, and the first logical channel LCH0 corresponds to the first physical channel PCH0, and the second logical channel LCH1 corresponds to the second physical channel PCH1 and so on. The printing module corresponding to the logical channel corresponding to each physical channel is determined according to the printing module corresponding to each physical channel, for example, in this embodiment, the physical channels PCH0~PCH2 belong to the printing module 1, and the logical channels LCH0~LCH2 belong to the printing module 1; the physical channels PCH3~PCH6 belong to the printing module 2, and the logical channels LCH3~LCH6 belong to the printing module 2; the physical channel PCH7 belongs to the printing module 3, and the logical channel LCH7 belongs to the printing module 3; the physical channels PCH8~PCH11 belong to the printing module 4, and the logical channels LCH8~LCH11 belong to the printing module 4; by numbering each of the physical channels and each of the logical channels, the printing module corresponding to each logical channel, the relative position of each logical channel in the corresponding printing module and the data length corresponding to each logical channel can be determined, the data length corresponding to the logical channel is equal to the length of the physical channel, and the length of the physical channel represents the number of nozzles owned by the physical channel, wherein the data length of the logical channel may also be greater than the length of the physical channel According to the above method, the corresponding relationship between the physical channel, the logical channel, and the printing module is established, and the one-to-one correspondence between the physical channel, the logical channel, and the printing module is ensured, thereby ensuring the independent control of each printing module.

In another embodiment, each printing module is located in the same Onepass printing device, one inkjet head corresponds to one physical channel, the number of the logical channel is greater than that of the physical channel, and there are at least two printing modules sharing one physical channel, referring to FIG. 4, the method for configuring the logical channel for each of the printing modules comprises steps of:

S211) confirming the shared physical channel and the dedicated physical channel among all physical channels according to printing requirements, wherein the shared physical channel belongs to y printing modules, and the dedicated physical channel belongs to only one printing module, y≥2, y is an integer; and S212) configuring m logical channels for each of the shared physical channels and configuring z logical channels for each of the dedicated physical channels, wherein m≥y, z≥1, and m and z are integers.

Specifically, the shared physical channel and dedicated physical channel among all physical channels are confirmed according to printing requirements, the number of logical channels configured for the shared physical channel is greater than or equal to the number of printing modules it belongs to, and the dedicated physical channel is configured with at least one logical channel, in this embodiment, the printing device comprises a total of 12 inkjet heads and 12 physical channels, each physical channel is numbered with a certain end of the inkjet head arrangement direction (X-axis direction) as the starting point, the direction perpendicular to the inkjet head arrangement direction is the printing direction (Y-axis direction), the leftmost end is used as the starting point in this embodiment, the number of each physical channel ranges from PCH0 to PCH11, PCH0 represents the first physical channel, PCH1 represents the second physical channel, PCH3 represents the third physical channel and so on. the number of logical channels is greater than the number of physical channels, in this embodiment, there are 4 printing modules, and the number of logical channels is 4 times the number of physical channels, a total of 48 logical channels are allocated, and the 48 logical channels are numbered from LCH0 to LCH47, LCH0 means the first logical channel, LCH1 means the second logical channel and so on, then the logical channels LCH0~LCH11 belong to the printing module 1, and the logical channels LCH12~LCH23 belong to the printing module 2, then the logical channels LCH24~LCH35 belong to the printing module 3, and the logical channels LCH36~LCH47 belong to the printing module 4; by numbering each of the physical channels and each of the logical channels, the printing module corresponding to each logical channel, the relative position of each logical channel in the corresponding printing module and the data length corresponding to each logical channel can be determined, the data length corresponding to the logical channel is equal to the length of the physical channel, and the length of the physical channel represents the number of nozzles owned by the physical channel. This embodiment is aimed at the situation when there are printing modules sharing a physical channel, by configuring several logical channels for each physical channel, and then assigning several logical channels to different printing modules according to task parameters, therefore the shared physical channel is split into different printing modules to ensure independent control of each printing module.

In an embodiment, the printing requirement command comprises a width command of the product to be printed along the inkjet head arrangement direction, and the step of dividing all physical channels into several groups according to the printing requirement command comprises steps of: dividing all physical channels in the device to be printed into several groups according to the width command of the product to be printed along the inkjet head arrangement direction, if there are 3 copies of the product to be printed, the first copy of the product to be printed needs 2 physical channels to print, the second copy of the product to be printed needs 5.5 physical channels to print, and the third copy of the product to be printed needs 3 physical channels to print, dividing all physical channels into three parts corresponding to 3 copies of the product to be printed according to a ratio of 2:6:3, each of which is one printing module, and the printing module is flexibly configured according to customer needs, which is convenient for application.

Figure 5:
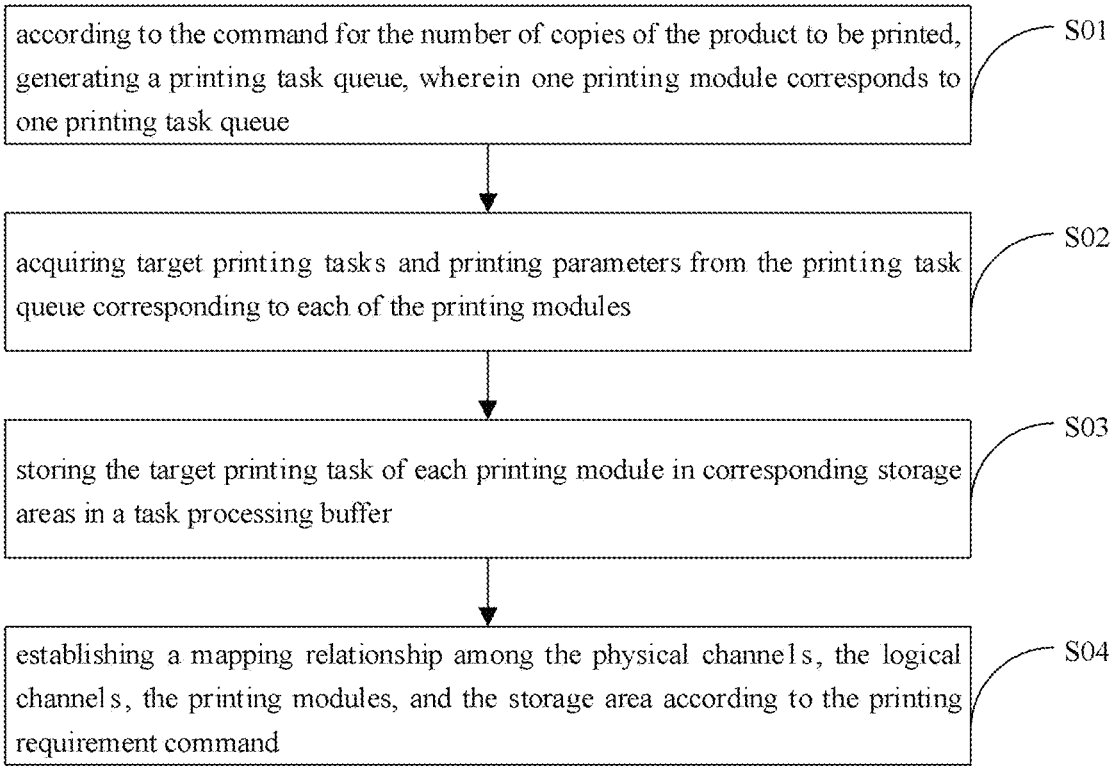
FIG. 5 is a flow chart of printing establishment of the task queue of the Onepass system inkjet printing control method according to the preferred embodiment of the present invention.

In an embodiment, the printing requirement command also comprises: a command for the number of copies of the product to be printed; referring to FIG. 5, after the step S2, the method further comprises steps of:

S01) according to the command for the number of copies of the product to be printed, generating a printing task queue, one printing module corresponding to one printing task queue;

S02) acquiring target printing tasks and printing parameters from the printing task queue corresponding to each of the printing modules;

S03) storing the target printing task of each printing module in corresponding storage areas in a task processing buffer; and S04) establishing a mapping relationship among the physical channels, the logical channels, the printing modules, and the storage areas according to the printing requirement command.

Figure 6:
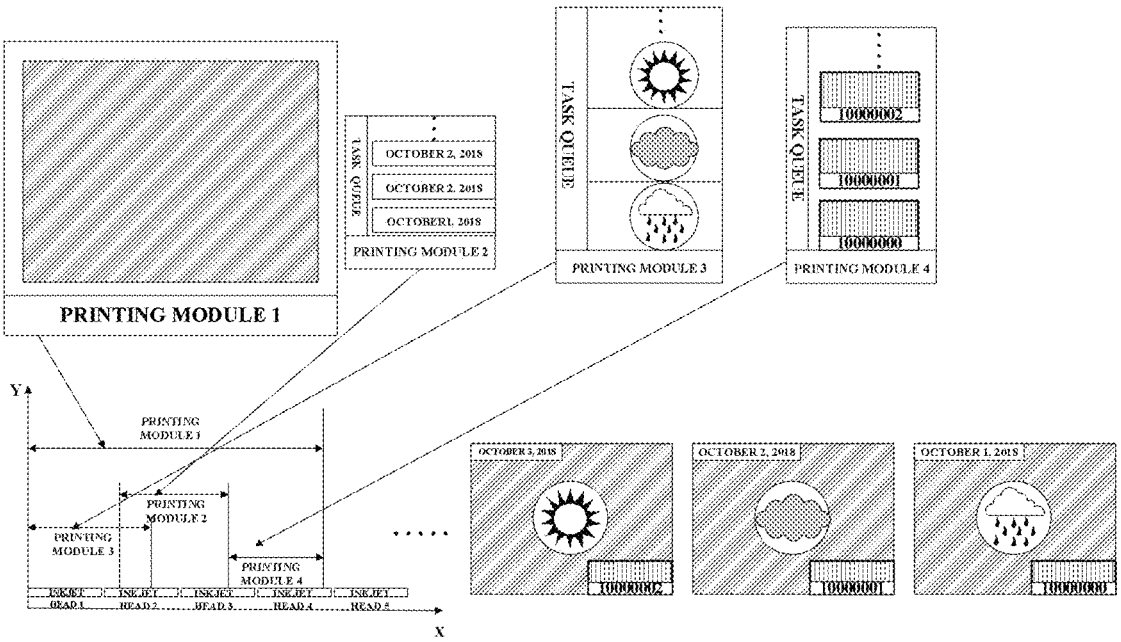
FIG. 6 is a schematic diagram of the printing process of the Onepass system inkjet printing control method according to a preferred embodiment of the present invention.

Specifically, referring to FIG. 6, in this embodiment, according to the width of the product to be printed along the inkjet head arrangement direction, all physical channels are divided into 4 groups, which are printing module 1, printing module 2, printing module 3, and printing module 4, then, according to the number of copies of the product to be printed, a printing task queue is generated for printing module 1, printing module 2, printing module 3, and printing module 4, the printing task queues of the four printing modules contain the same number of printing tasks, in this embodiment, the printing task queue of the printing module 1 currently has only one task queue, namely the task queue of the background image in FIG. 6, the printing module 2 contains several printing task queues, namely the date task queue in FIG. 6, such as "Oct. 1, 2018, Oct. 2, 2018, Oct. 3, 2018, etc.", the printing module 3 contains several printing task queues, namely the weather task queue in FIG. 6 such as "rainy, cloudy, sunny, etc.", the printing module 4 contains several printing task queues, namely the barcode task queue in FIG. 6 such as "100000, 100001, 100002, etc."; then each printing module reads the corresponding printing parameter in sequence according to the order of the printing task queue, and establishes the target printing task while reading the printing parameter, after the target printing task is created, it is stored in a certain storage area in the task processing buffer, each printing module in the task processing buffer has a corresponding target printing task storage area, finally the mapping relationship between the physical channel, logical channel, printing module, and storage area is established according to the printing requirements, so that the four are connected with each other, and at the same time, the independent control of each printing module is ensured, after the printing command is started, the corresponding printing data extracted from the printing memory in units of the logical channel can be processed conveniently, quickly and accurately according to the mapping relationship, and then input into the corresponding physical channel for printing.

Figure 7:
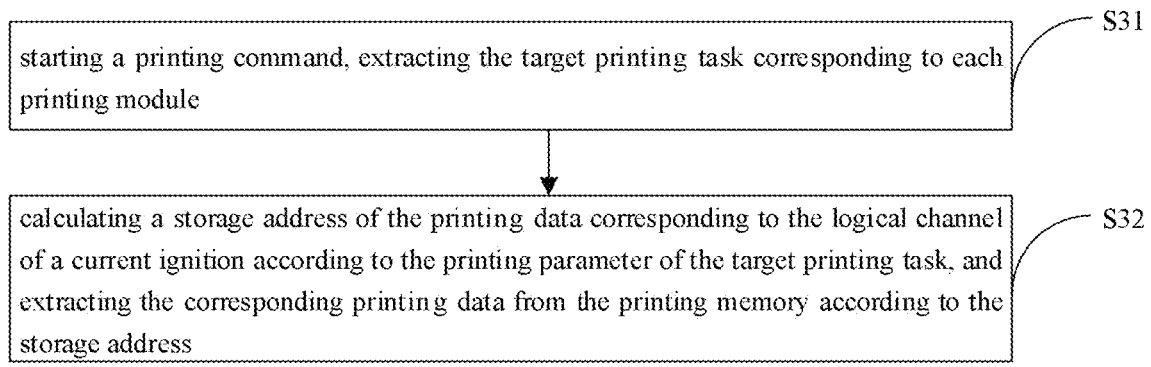
FIG. 7 is a flow chart of first data extraction of the Onepass system inkjet printing control method according to the preferred embodiment of the present invention.

In an embodiment, referring to FIG. 7, the step S3 of starting a printing command, and extracting corresponding printing data from the printing memory in units of the logical channel specifically comprises the steps as follows:

S31) starting a printing command, extracting target printing queues of each printing module from the task processing buffer according to the mapping relationship; and S32) calculating a storage address of the printing data corresponding to the logical channel of a current ignition according to the printing parameter of the target printing task, and extracting the corresponding printing data from the printing memory according to the storage address.

Figure 8:
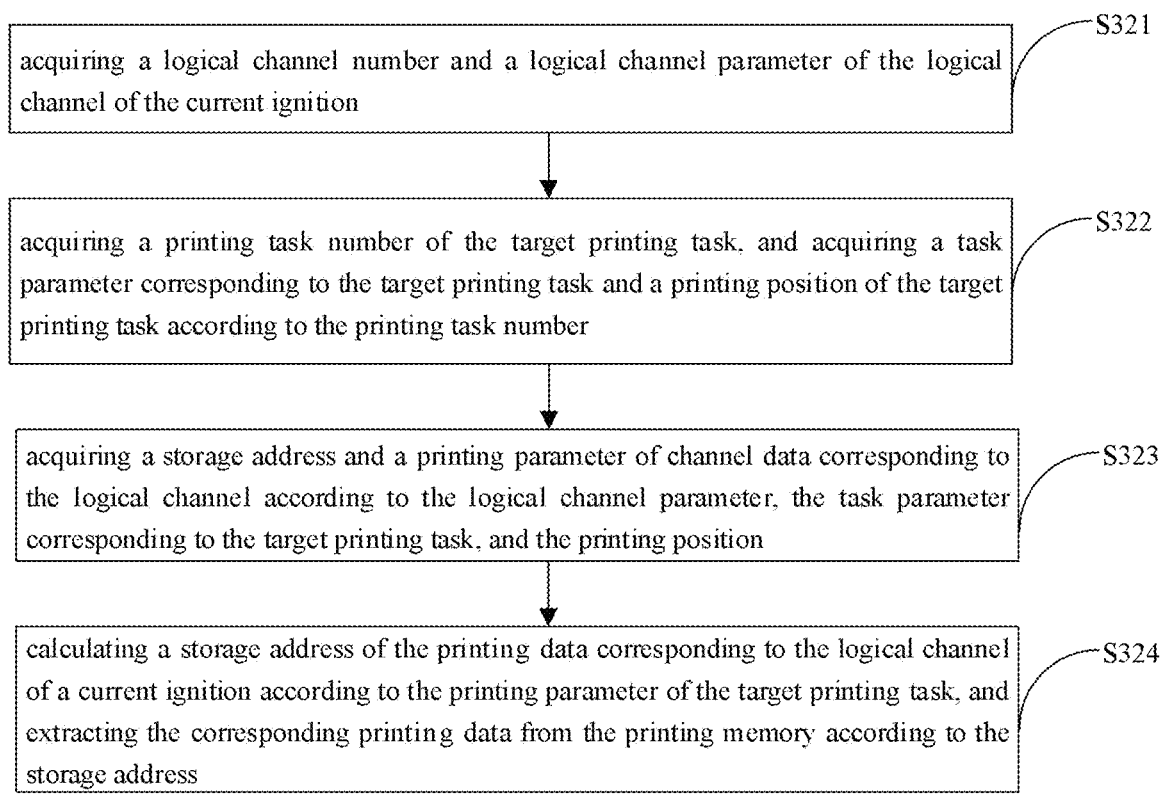
FIG. 8 is a flow chart of second data extraction of the Onepass system inkjet printing control method according to a preferred embodiment of the present invention.
Figure 9:
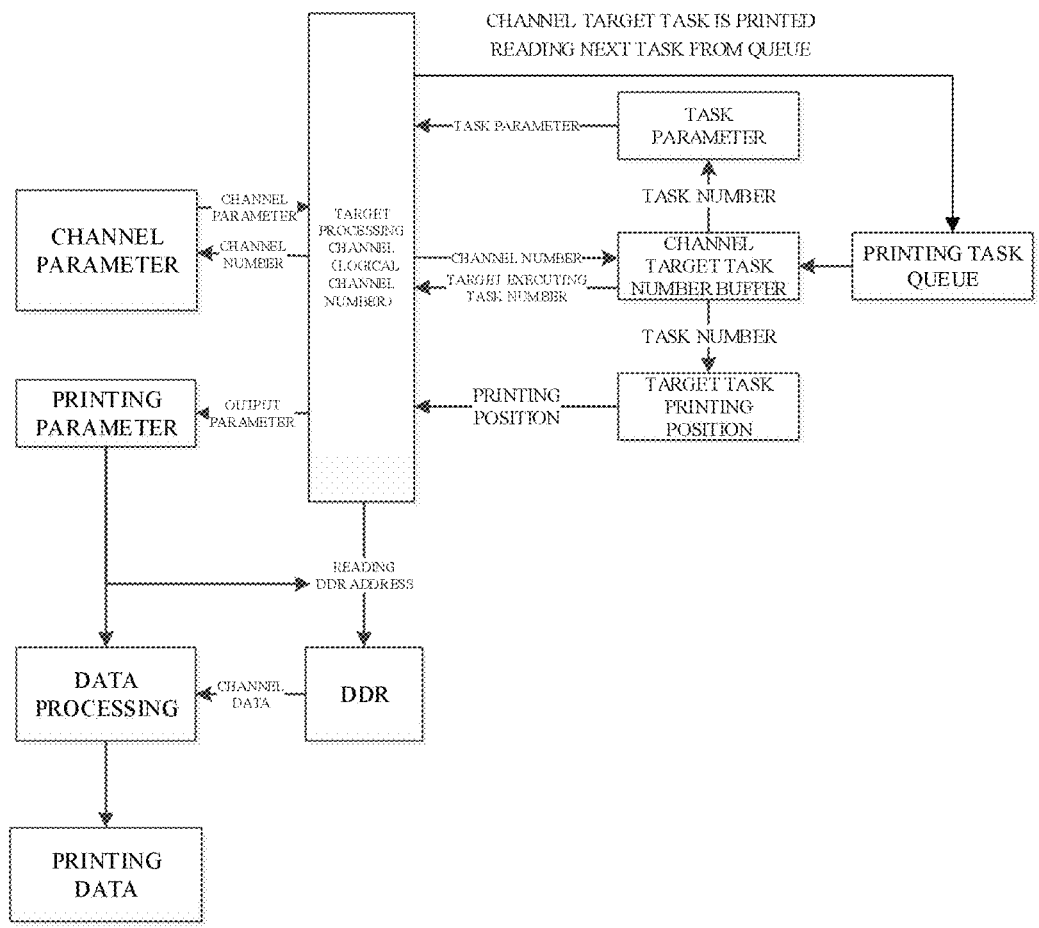
FIG. 9 is a schematic diagram of logical channel data extraction of the Onepass system inkjet printing control method according to a preferred embodiment of the present invention.

In this embodiment, referring to FIG. 8, the step S32 of calculating the storage address of the printing data corresponding to the logical channel of the current ignition according to the printing parameter of the target printing task, and extracting the corresponding printing data from the printing memory according to the storage address specifically comprises the steps as follows:

S321) acquiring a logical channel number and a logical channel parameter of the logical channel of the current ignition;

S322) acquiring a printing task number of the target printing task, and acquiring a task parameter corresponding to the target printing task and a printing position of the target printing task according to the printing task number;

S323) acquiring a storage address and a printing parameter of channel data corresponding to the logical channel according to the logical channel parameter, the task parameter corresponding to the target printing task, and the printing position; and S324) extracting the channel data from the printing memory according to the storage address, and processing the channel data and the printing parameter to obtain the printing data;

Referring to FIG. 9, specifically in a certain printing, the logical channel number needs to be obtained first, and the corresponding logical channel parameter and the target printing task number of the logical channel are obtained at the same time as the logical channel number is obtained; the task parameter and the printing position of the task are obtained at the same time according to the target printing task number, then the storage address and printing parameter of the channel data corresponding to the logical channel in the printing memory can be obtained by calculation of the logical channel parameter, the task parameter corresponding to the target printing task, and the printing position, and the channel data can be correctly extracted from the printing memory according to the storage address, after the channel data is processed according to the printing parameters to obtain the printing data, the printing data can be accurately input to the physical channel for inkjet printing according to the mapping relationship between the logical channel and the physical channel, wherein the task parameter comprises the printing size of the printing target image corresponding to the target printing task, the number of physical channels and physical channel positions that need to be used in the printing process are determined according to the size of each printing target image, then the logical channels are configured for the printing task according to the number of physical channels, and logical channel parameters such as the relative position between each logical channel are determined according to the physical channel position, therefore the logical channel parameter comprises channel offset, channel enable and number of channel insertion points, and the channel offset is used to determine whether the corresponding channel is working in the target printing task, the number of channel insertion points is specifically used to calculate the storage address of the corresponding data in the memory, namely the channel data address corresponding to the logical channel of a certain printing task is: the number of channel insertion points multiplied by the data length corresponding to the logical channel plus the starting data address of the current print line. In another embodiment, the printing size, starting pixel point and end pixel point of the target printing image, the number of connected inkjet heads, and the number of nozzle columns of all physical channels are used; through the pixel plane coordinate system, the Onepass printing data of the target printing image is associated with the physical channel, the number of connected inkjet heads, the number of nozzle columns of all physical channels, etc., then combined with the image characteristics and the characteristics of Onepass printing technology, the shield information of the image data that needs to be shielded when the target printing image is printed is determined, according to the shield information, the inkjet head row of the physical channel can be controlled so that it does not eject ink, so as to achieve accurate shield processing on part of the image data of the target printing image, which meets the printing needs of different users.

Figure 10:
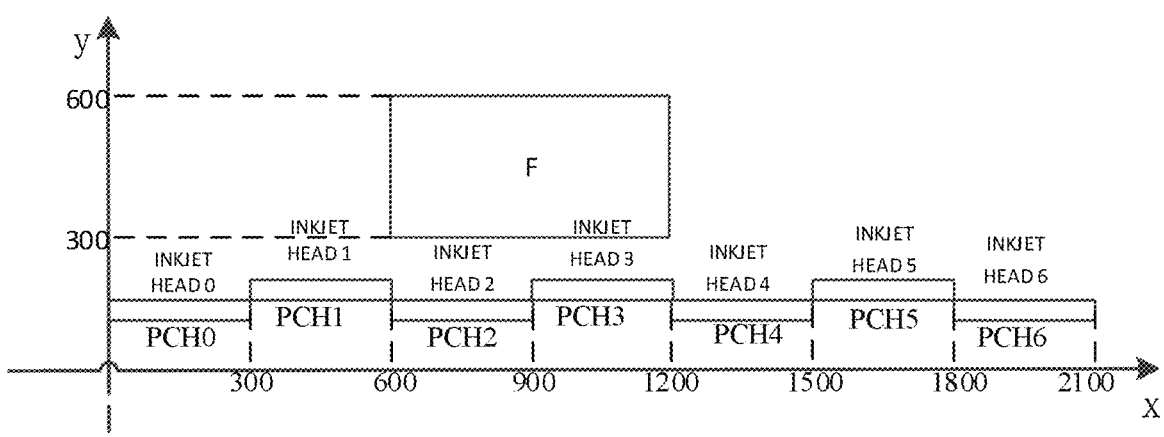
FIG. 10 is a schematic diagram of logical channel determination of the Onepass system inkjet printing control method according to a preferred embodiment of the present invention.

The printing position comprises the coordinate value of the target printing task relative to the printing platform in a first direction and the target printing coordinate value in a second direction perpendicular to the first direction, when all logical channels finish reading data once, the target printing coordinate value of the target printing task is increased by 1. Specifically, referring to FIG. 10, the printing size of the printing target image F in the target task parameters is the length of the two inkjet heads along the inkjet head arrangement direction (x direction), in this embodiment, it is defined that an inkjet head can print 300 pixels (namely the number of nozzles of an inkjet head is 300), the direction along the vertical nozzle arrangement (y direction) is the length of one nozzle, and the specific printing position is from the third inkjet head to the fourth inkjet head. Taking one physical channel corresponding to one nozzle as an example, when each physical channel is configured with a logical channel, then the channel offset of the logical channel PCH0 in the x-axis direction is the distance of 0 inkjet heads, namely no offset, the channel offset of the logical channel PCH1 in the x-axis direction is the distance of 1 nozzle, namely 300 pixels, the channel offset of the logical channel PCH2 in the x-axis direction is the distance between 2 inkjet heads, namely 600 pixels, by analogy, the channel offset of each logical channel in the x-axis direction is obtained. After being processed by an image raster processor, the printing image is arranged according to the original data, namely the image of 720*720 DPI needs to print 720 pixels per inch in each column and row. However, the actual inkjet head has only 360 nozzles, that is, it can print up to 360 pixels at a time, 720 pixels need to be printed twice, so the data needs to be split, in order to make the data print evenly, 720 pixels are staggered into two copies and the insertion points are numbered, that is, each copy has a number of insertion points. The printing position is the accurate coordinate value of the specific printing of the target image relative to the printing platform, so that the printing device can clearly know the specific printing position of the target image, as shown in FIG. 3, the coordinate value of the current printing task in the printing position relative to the printing platform in the first direction (X direction) is 600 pixels, the range of the current printing coordinate value in the second direction (Y direction) perpendicular to the first direction is 300 pixels to 600 pixels, when all logical channels complete data reading once, the current printing coordinate value of the current printing task increased by 1, the current printing coordinate value is a value of a Y-axis accumulator of the printing device, the Y-axis accumulator is connected to the grating in the Y direction of the printing device, and the specific position count is acquired according to the grating.

Figure 11:
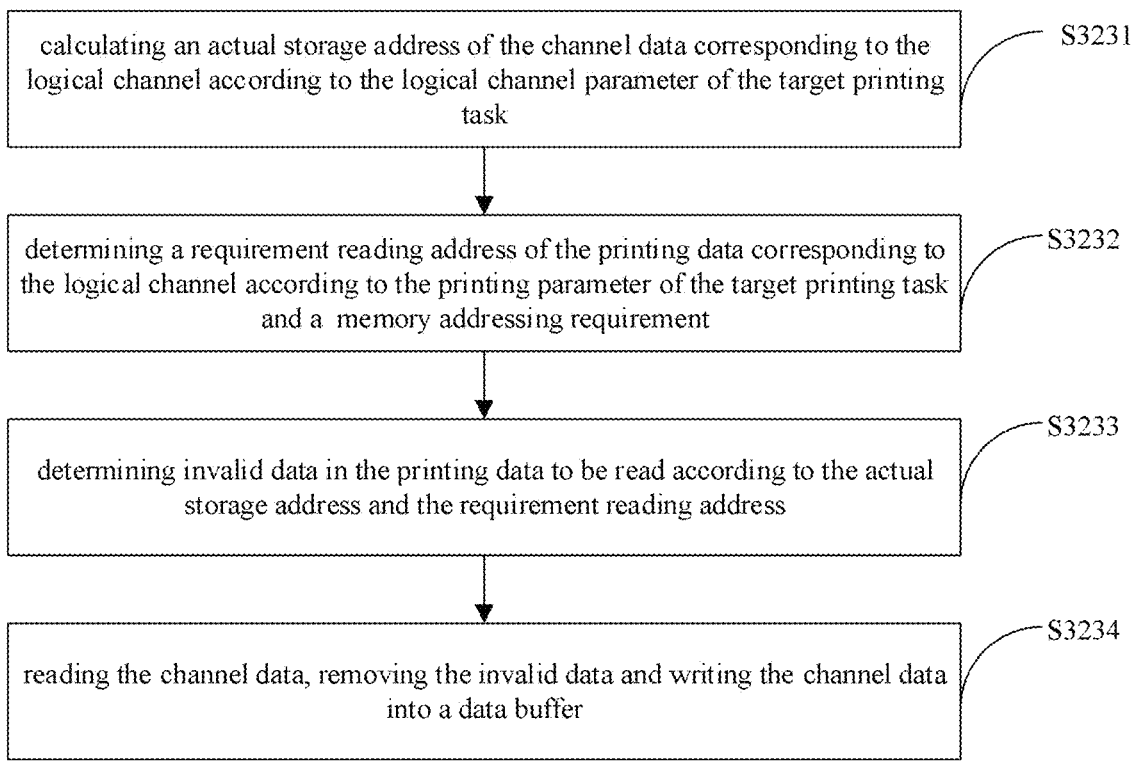
FIG. 11 is a third data extraction flow chart of the Onepass system inkjet printing control method according to a preferred embodiment of the present invention.

In an embodiment, referring to FIG. 11, the step S323 comprises the steps as follows:

S3231) calculating an actual storage address of the channel data corresponding to the logical channel according to the logical channel parameter of the target printing task;

S3232) determining a requirement reading address of the printing data corresponding to the logical channel according to the printing parameter of the target printing task and a memory addressing requirement;

S3233) determining invalid data in the printing data to be read according to the actual storage address and the requirement reading address; and S3234) reading the channel data, removing the invalid data and writing the channel data into a data buffer.

Specifically, the extraction of the printing data in the present embodiment requires an integer multiple alignment of bytes, such as 64 bit, 56 bit, etc., however, the actual stored printing data is not aligned, so the alignment is required when reading the printing data, according to the printing parameters, the actual storage address of the printing data corresponding to the logical channel of this ignition can be calculated, and then the requirement reading address of the printing data corresponding to the logical channel is determined according to the memory addressing requirement, the data stored in the range from the requirement reading address to the actual storage address is the invalid data in the printing data, finally, the printing data is read and written in the data buffer after the invalid data is removed, at this time, the printing data in the data buffer is aligned in integer multiple of bytes.

Figure 12:
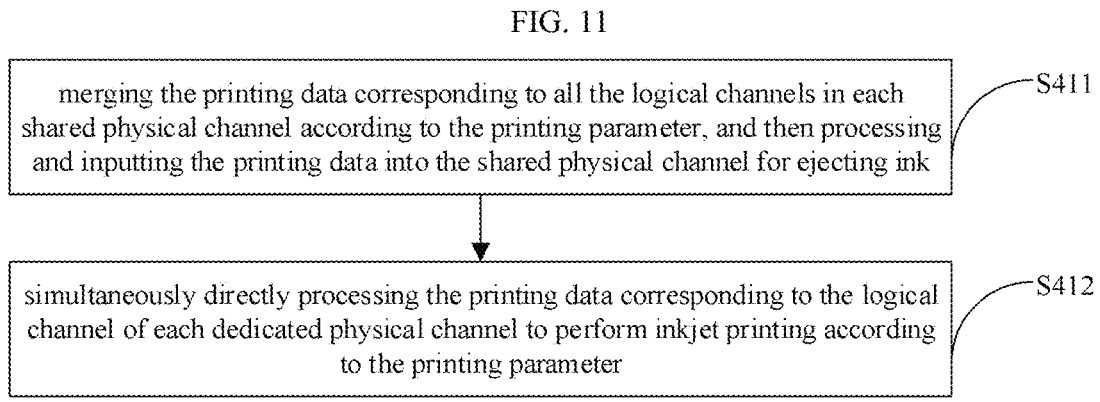
FIG. 12 is a data processing flow chart of the Onepass system inkjet printing control method according to the preferred embodiment of the present invention.

In an embodiment, the processing of printing data comprises: shield processing, feathering processing, merging processing. Specifically, according to the printing parameter, the printing data in the data buffer is subjected to correlation calculation with the data determined by the printing requirement, for example, when the width of the product to be printed along the direction of the inkjet head is smaller than the maximum printing width of the printing device, there will be some physical channels that do not eject ink, at this time, it is necessary to perform shield processing on it, for the part of physical channel splicing, in order to ensure that its printing effect, feather processing is required, the data is divided into two parts and printed by two physical channels without repetition. Referring to FIG. 12, when there is a shared physical channel, multiple data of the shared physical channel requires merging before printing, specifically including the following steps:

S411) merging the printing data corresponding to all the logical channels in each shared physical channel according to the printing parameter, and then processing and inputting the printing data into the shared physical channel for ejecting ink; and S412) simultaneously directly processing the printing data corresponding to the logical channel of each dedicated physical channel to perform inkjet printing according to the printing parameter.

The embodiment confirms the shared physical channel and the dedicated physical channel among all the physical channels according to the printing requirements, then configures at least 2 logical channels for each of the shared physical channels, configures at least one physical channel for each dedicated physical channel, and separates the printing modules to which the shared physical channel belongs through the logical channel as a bridge to ensure independent control of each printing module; at the same time, the embodiment extracts the corresponding printing data from the printing memory in the unit of the logical channel, and merges the print data corresponding to all the logical channels in each of the common physical channels and then processes and inputs into the shared physical channel for printing, and directly processes the printing data corresponding to the logical channel of each dedicated physical channel and inputs into the dedicated physical channel for printing, which not only guarantees that each printing module can independently control the corresponding printing task and can accurately print at a predetermined location.

EMBODIMENTS OF THE PRESENT INVENTION

Embodiment 1

Figure 13:
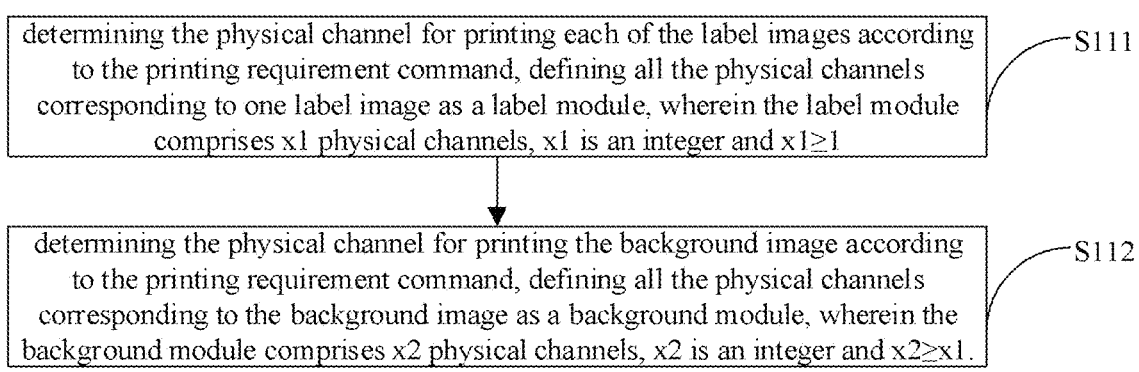
FIG. 13 is a flowchart of local variable image printing control in the Onepass system inkjet printing control method according to the first embodiment of the present invention.

The number of label images in a variable image is set to be "a", wherein a is an integer and a≥1, the "a" label images are distributed in different positions of the background image in accordance with a predetermined typesetting rule, referring to FIG. 13, the step of dividing all physical channels into several groups according to the printing requirement command comprises the steps as follows:

S111) determining the physical channel for printing each of the label images according to the printing requirement command, defining all the physical channels corresponding to one label image as a label module, wherein the label module comprises x1 physical channels, x1 is an integer and x1≥1; and S112) determining the physical channel for printing the background image according to the printing requirement command, defining all the physical channels corresponding to the background image as a background module, wherein the background module comprises x2 physical channels, x2 is an integer and x2≥x1.

In an embodiment, the printing requirement command comprises a printing start command and a task parameter, the printing start command comprises a command for the number of copies of the variable image to be printed and a command for selecting the background image, the task parameter is obtained according to the predetermined typesetting rule, and the task parameter comprises: a width of each label image and the background image along a direction in which the inkjet heads are arranged.

Specifically, referring to FIG. 14, in this embodiment, there are three label images in each variable image, namely the label image A, the label image B and the label image C, each of the label images in each variable image corresponds to a label image data; "a" label images in each variable image are distributed in different positions of the background image according to the predetermined typesetting rule, for example, the label image B is located in the geometry center of the background image, the label images A and C are symmetrically located on both sides of the label image B.

The above only lists one typographic rule, the label images and the background images can have a variety of typographic rules in a picture, which are specifically set according to aesthetic requirements and are not limited here. The label module of each of the label images is determined according to the width of each of the label images along the arrangement direction of the inkjet head, namely determining the physical channel which prints each label image; the background module of the background image is determined according to the width of the background image along the arrangement direction of the inkjet head, namely determining the physical channel which prints the background image. In this embodiment, one physical channel corresponds to one inkjet head, each printing module corresponds to several physical channels, ensuring that each printing module is independently controlled. When there is a shared physical channel of the label module and the background module, at this time, the label image data and the background image data corresponding to the shared physical channel are merged to obtain printing data of the shared physical channel, when printing, the shared physical channel performs inkjet printing according to the printing data.

In an embodiment, referring to FIG. 15, the mapping relationship of the data extraction rule is established for each independently controlled printing module group, ensuring that the data of each module can accurately extract the corresponding physical channel, which comprises the following specific steps:

S221) configuring n logical channels for each of the label modules, and one logical channel in each of the label modules corresponding to one physical channel in the label module;

S222) configuring m logical channels for each of the background modules, and one logical channel in each of the background modules corresponding to one physical channel in the background module; and S223) establishing a mapping relationship between the physical channels, the logical channels, and the printing modules.

Specifically, by establishing a mapping relationship between the physical channel, the logical channel, and the printing module, in the printing control system, extracting the printing data corresponding to the current printing task of each printing module from the memory according to the mapping relationship in units of the logical channel, at the same time merging the printing data corresponding to all logical channels of the same physical channel according the mapping relationship, then outputting and printing, using the logical channel as bridge to establish a mapping relationship between the actual physical channel and the dynamically changing module, so as to ensure that the printer can flexibly print a variety of products, and the data processing is clear.

Figure 16:
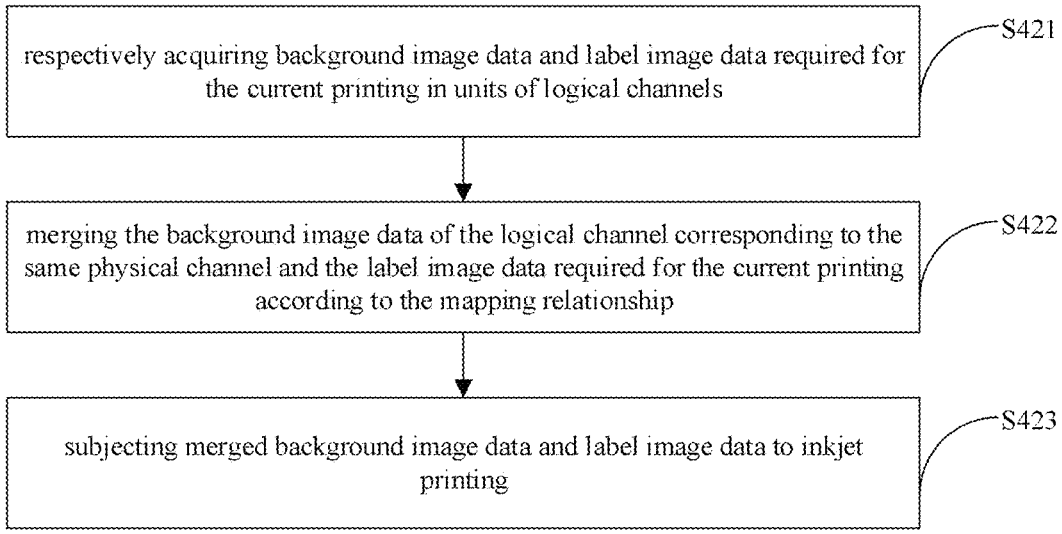
FIG. 16 is a flowchart of a printing data processing method in the Onepass system inkjet printing control method according to the first embodiment of the present invention.

In an embodiment, referring to FIG. 16, the step of combining with the logical channel, merging the background image data and each acquired label image data in accordance with the predetermined typesetting rule, and inputting into the corresponding physical channel for inkjet printing, specifically comprises the following steps:

S421) respectively acquiring background image data and label image data required for the current printing in units of the logical channel;

S422) merging the background image data of the logical channel corresponding to the same physical channel and the label image data required for the current printing according to the mapping relationship; and S423) subjecting merged background image data and label image data to inkjet printing.

Specifically, referring to FIG. 14, in this embodiment, the local dynamic variable image is composed of a fixed background image F and 3 dynamically changing label images A, B and C, the background image F is rasterized only once in the image raster processor, and then the obtained background image data is downloaded to the memory of the printer, in this embodiment, the memory is DDR, and the image raster processor is located in the upper computer, wherein the image raster processor may also be located in the printer, such as a printing all-in-one machine, the image raster processor is located in the printer, and the image is directly input to the printer for outputting and printing after being processed in the raster processor; at the same time, the starting address of the background image data in the DDR is obtained, according to the command for the number of copies of the variable image to be printed, the starting address of the background image data in the DDR and the command for number of copies of the background image to be printed are input into the printing task queue of the background image, the printing task queue of the background image F is written and maintained by ram, the background image F only requires one image processing and one image data download, which reduces the amount of data processing and data transmission of the image raster processor; the label image A (including A1~An) is dynamically generated according to a predetermined rule and then sequentially subjected to image rasterization in the image raster processor, the predetermined rule of the label image A is the change rule of the date, for example, the date of label image A1 is "Oct. 1, 2018", the date of label image A2 is "Oct. 2, 2018", and the date of label image A3 is "Oct. 3, 2018", the label image A is generated in sequence; then the label image data of label image A obtained is sequentially downloaded to the memory of the printer, while downloading, the starting address of the label image data of label image A in the DDR is sequentially written into the printing task queue corresponding to label image A; the processing method of label image B (including B1~Bn) and C (including C1~Cn) is the same as that of label image A, and will not be repeated here. During printing, the background image data and the label image data are sequentially extracted according to the printing task queue, and the background image data and the label image data are merged according to a predetermined typesetting rule and printed out to obtain a complete variable image, such as variable image 1, variable image 2, variable image 3, etc. in FIG. 14, wherein the predetermined typesetting rule is obtained according to the interactive operation command in an interactive design interface of the variable image, the predetermined typesetting rule clarifies the position of each label image in the variable image of the same background image in the background image, as shown in FIG. 14, the label image B is located at the geometric center of the background image, and the label images A and C are symmetrically located on both sides of the label image B. According to the printing task queue, extraction and merging are performed in turn, for example, the label image data corresponding to the label image A1, label image B1, and label image C1 in FIG. 14 and the background image data corresponding to the background image F are merged according to a predetermined typesetting rule, the label image data corresponding to the label image A2, the label image B2, and the label image C2 and the background image data corresponding to the background image F are merged according to the predetermined typesetting rule, etc., for each merging, a printout is performed, as shown in FIG. 14, variable image 1, variable image 2, variable image 3, etc. are input in sequence. However, in the specific printing, the corresponding module prints the data of the corresponding image, when the label module and the background module share the physical channel, at this time, the label image data and background image data corresponding to the shared physical channel are merged to obtain the printing data of the shard physical channel during printing, the shared physical channel performs inkjet printing according to the printing data, wherein the merging comprises replacing the data of the shared physical channel with the data of the label image or splicing the data of the corresponding two label modules of the shared physical channel; as shown in FIG. 14, the background module F prints the background image F, the label module A prints the label image A, the label module B prints the label image B, and the label module C prints the label image C.

Figure 17:
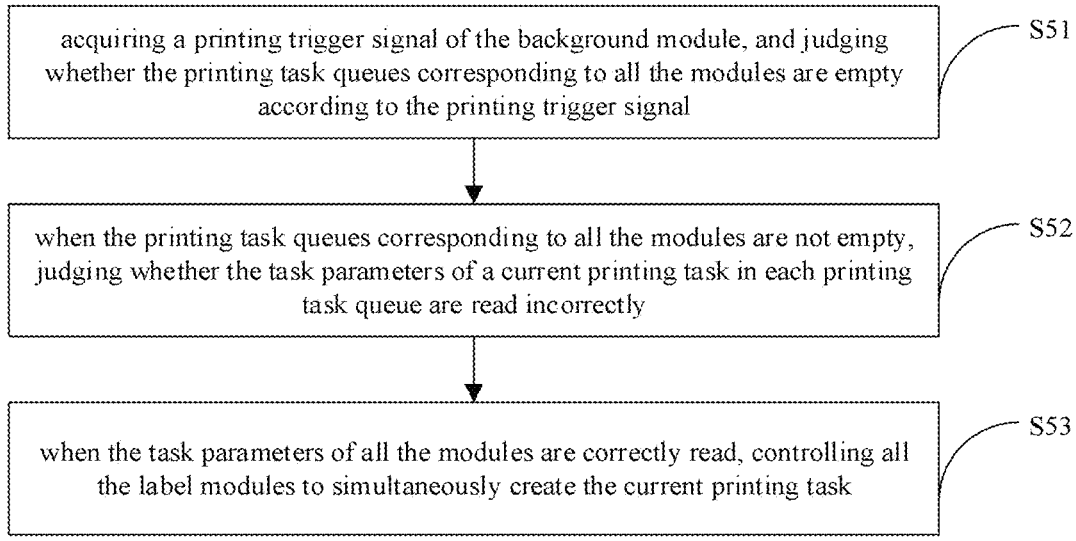
FIG. 17 is a flowchart of a method for synchronously creating a printing task in the Onepass system inkjet printing control method according to the first embodiment of the present invention.

After each of the printing modules is independently controlled, a unique method for creating printing tasks is required to ensure that the background image and each label image in a variable image can be matched and printed, in an embodiment, referring to FIG. 17, the method for each module to synchronously create a printing task specifically comprises the following steps:

S51) acquiring a printing trigger signal of the background module, and judging whether the printing task queues corresponding to all the modules are empty according to the printing trigger signal;

S52) when the printing task queues corresponding to all the modules are not empty, judging whether the task parameters of a current printing task in each printing task queue are read incorrectly; and S53) when the task parameters of all the modules are correctly read, controlling all the label modules to simultaneously create the current printing task.

Specifically, each of the printing modules has a printing trigger module, which is used to trigger each printing module to create its own printing task, when the images printed by each printing module are related, the same printing trigger signal is used to trigger each printing module to create a printing task, ensuring that the printing modules are related to each other; in this embodiment, the printing trigger signal of the background module is used as a unified signal for triggering each module to create a printing task.

In an embodiment, the printing trigger signal of the background module is an effective signal generated by an external optical sensor or an end signal of the last printing task. Adopting the effective signal generated by the external optical sensor requires additional equipment, using the end signal of the last printing task as the printing trigger signal needs to specify the end time of the printing task, the clear end signal is determined by setting the task interval.

Figure 18:
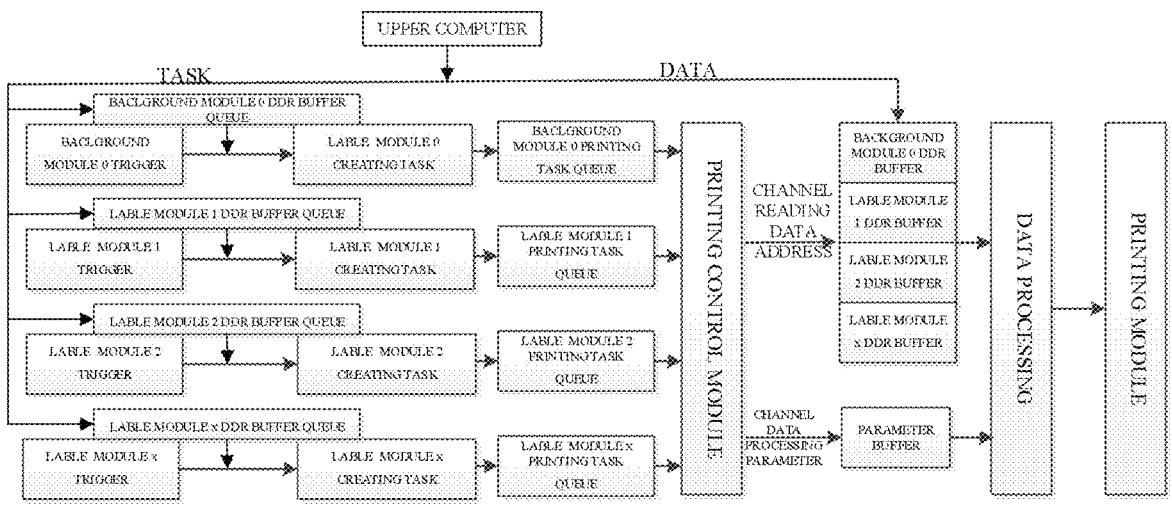
FIG. 18 is a schematic diagram of local variable image printing control in the Onepass system inkjet printing control method according to the first embodiment of the present invention.

Specifically, referring to FIG. 18, which is the specific implementation process of this embodiment, first the data corresponding to the variable image is obtained from the upper computer, each of the variable images comprises a background image 0 and x label images (1~x), the data comprises fixed background image data and label image data that dynamically changes according to the rule, the data is stored in the memory while tasks are cached to the corresponding module at the same time, wherein the tasks comprise the printing task of background module 0 and the printing task of label module (1~x), then a task is created for the cached printing task according to the trigger signal, and it is stored in the printing task queue of the corresponding module after creation, then the printing control extracts the data according to the storage address of the image data in the printing task queue of each module, performs one or more of feathering, shielding, and merging, and then inputs the data to the printing module for printing. Specifically, for a certain printing, some physical channels need to discharge ink, and some physical channels do not need to discharge ink, and the physical channels that do not need to discharge ink need to be shielded according to the data extracted by the corresponding logical channel to make it impossible to discharge ink; when higher printing quality is required for some images, the image is generally feathered during printing to make the printing effect better, the specific operation is to perform the AND operation of the printing data corresponding to the image with the feathering template data to make the printed image better; when printing a variable image, each image in a type of variable image has the same background image, and in the same position of each image, there is a variable image that changes according to a certain rule, when printing this type of image, it is necessary to merge the background image data and variable image data corresponding to the same physical channel so that only the variable image data is printed.

In the embodiment 1, by separately acquiring the background image data corresponding to the fixed background image in the variable image and the label image data corresponding to the label image dynamically changing according to a predetermined rule, the fixed background image and the dynamically changing label image are processed and transmitted separately, wherein the background image data can be transmitted only once, therefore, the background image can also be rasterized only once, which reduces the amount of data processing and transmission of the image rasterization processor, the normal output of the product is ensured, which improves the efficiency of the printer, and saves the resources of the printer.

Embodiment 2

Figure 19:
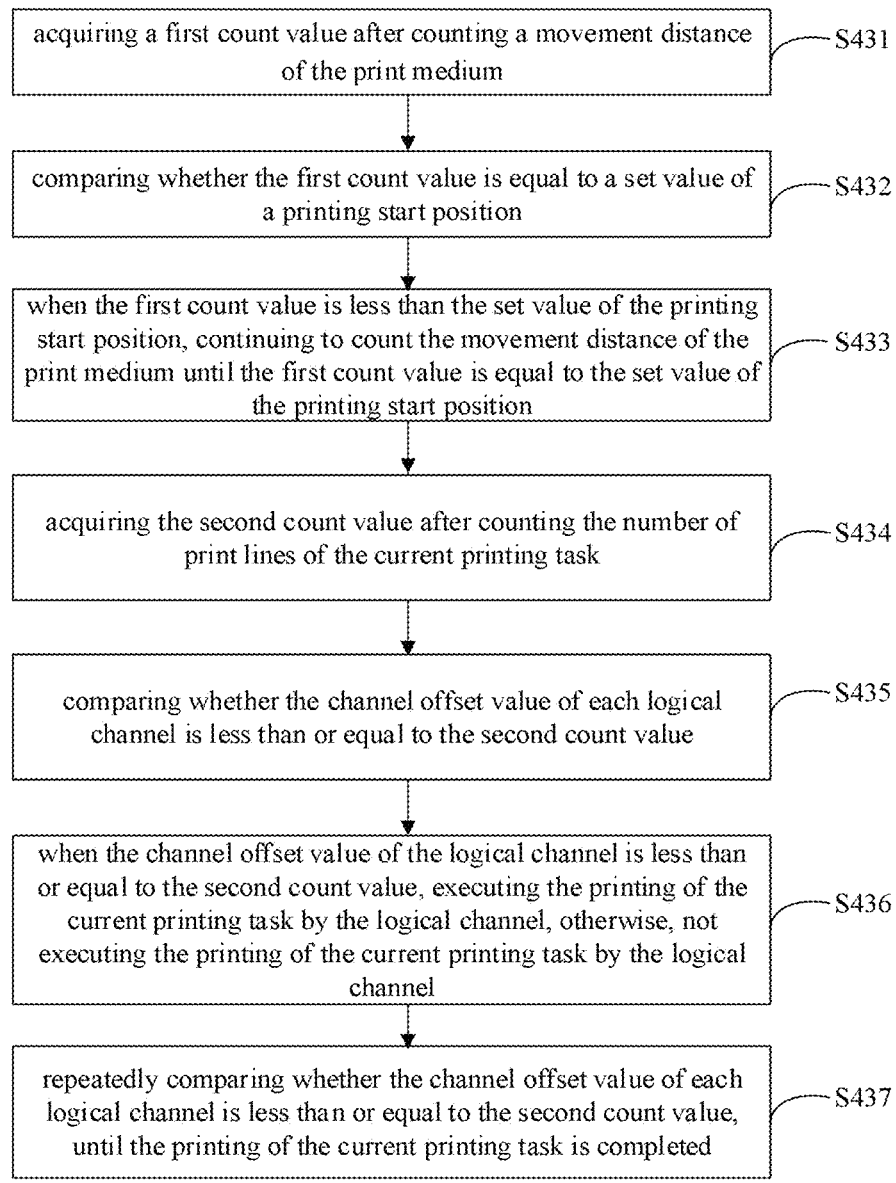
FIG. 19 is a flowchart of the first and last blank printing control in the Onepass system inkjet printing control method according to the second embodiment of the present invention.

When it is required to leave a certain amount of blank space on the top and bottom or left and right or around the print medium without printing, it is necessary to accurately locate the start printing position of the print medium, namely the control of the margin, referring to FIG. 19:

S431) acquiring a first count value after counting a movement distance of a print medium;

specifically, after the Onepass inkjet printer is started, the print medium conveying platform starts to convey the print medium and the first counter starts counting, the first count value of the first counter is increased by 1 each time the print medium moves by one line, wherein the counting signal of the first counter is calculated and obtained according to the task parameter, and the task parameter is obtained by downloading from the upper computer or the image processing software that comes with the Onepass inkjet printer when starting the current printing task, the specific process comprises: designing images in image processing software according to customer requirements or importing images transmitted by customers into image processing software, then processing the image format, color, etc. and setting the image parameters, the image parameters comprise the print medium, the size of the print medium, the size of the image, the position of the image relative to the print medium, the number of copies of the image, printing accuracy, etc., in this embodiment, the unit of the size of the print medium is the number of lines, namely the length of the print medium is 100 lines. Then the image processed by the image processing software is transferred to the Onepass inkjet printing device, the inkjet printing device sets the task parameters of this time according to the image parameters, and allocates printing modules for this task according to the task parameters and inkjet printing equipment, and allocates inkjet head for the printing modules, etc.; when the amount of printing tasks is relatively small this time, it can use only one printing module while other printing modules can print other tasks.

S432) comparing whether the first count value is equal to a set value of a printing start position;

specifically, each time the print medium moves one line, the first count value of the first counter is increased by 1 and is compared with the set value of the printing start position to determine whether it has reached the initial printing position, when the first count value is equal to the set value of the printing start position, the creation of this printing task is started, when the first count value is greater than the set value of the printing start position, the current printing task has already started, so that the counting of the first counter can be stopped or continued, then, the count value of the first counter is compared with the count value of the second counter to verify and calibrate the second counter, wherein the setting value of the printing start position is the counting signal of the first counter obtained by converting the margin value set by the customer into the number of blank print lines according to the printing accuracy.

Figure 20:
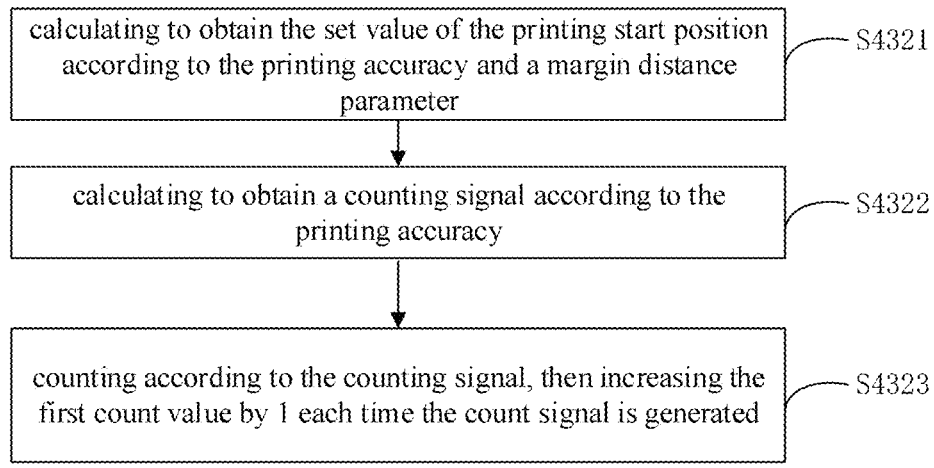
FIG. 20 is a flowchart of a counting signal acquisition method in the Onepass system inkjet printing control method according to the second embodiment of the present invention.

In an embodiment, referring to FIG. 20, the step S432 of comparing whether the first count value is equal to a set value of the printing start position specifically comprises the following steps:

S4321) calculating to obtain the set value of the printing start position according to the printing accuracy and a margin distance parameter;

S4322) calculating to obtain a counting signal according to the printing accuracy; and S4323) counting according to the counting signal, then adding the first count value by 1 each time the counting signal is generated.

Specifically, the first counter counts according to the counting signal, and the counting signal is generated once the first count value of the first counter is increased by 1, each time the first count value is increased by 1, it is compared with the set value of the printing start position to determine whether it has reached the initial printing position, when the first count value is equal to the set value of the printing start position, the creation of the current printing task is started.

Figure 21:
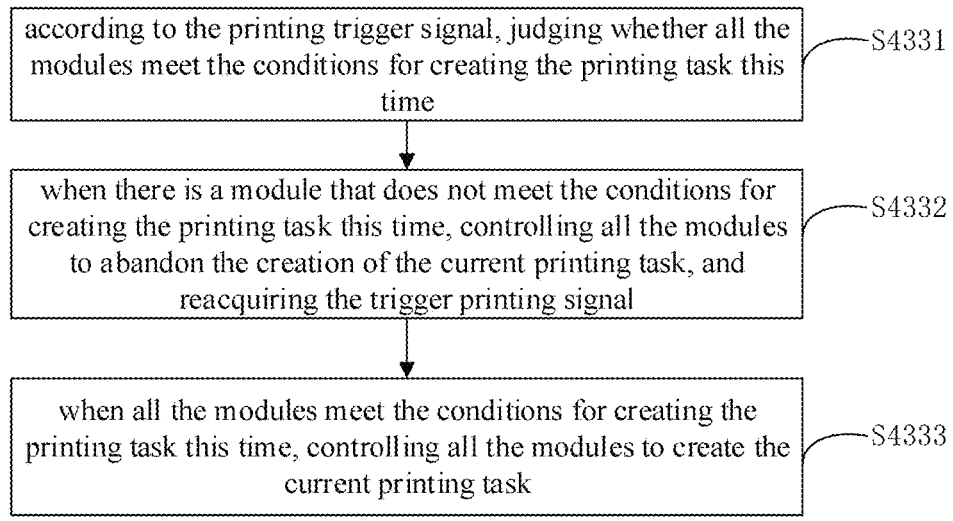
FIG. 21 is a flowchart of synchronously creating a printing task in the Onepass system inkjet printing control method according to the second embodiment of the present invention.

S433) when the first count value is less than the set value of the printing start position, continuing to count the movement distance of the print medium until the first count value is equal to the set value of the printing start position; and S434) creating the current printing task, and acquiring the second count value after counting the number of print lines of the current printing task;

specifically, the current printing task is created according to the printing trigger signal, and when the current printing task is successfully created, the second counter is started to count. When there are multiple printing modules, it is also necessary to judge whether all the modules have successfully created the current printing task, referring to FIG. 21, the judgment step for multiple printing modules to create a printing task synchronously is as follows:

S4331) according to the printing trigger signal, judging whether all the modules meet the conditions for creating the printing task this time;

S4332) when there is a module that does not meet the conditions for creating the printing task this time, controlling all the modules to abandon the creation of the current printing task, and reacquiring the trigger printing signal; and S4333) when all the modules meet the conditions for creating the printing task this time, controlling all the modules to create the current printing task.

Specifically, in this embodiment, each printing module has an independent printing trigger signal to ensure that each printing module can independently trigger the creation of printing tasks, in order to ensure that each printing module can create printing tasks at the same time, in the present invention, the printing trigger signal of a certain printing module among all printing modules is used as the requirement signal for all printing modules to create a printing task, and whether all printing modules meet the conditions for creating a printing task this time is judged according to the same printing trigger signal, if all printing modules meet the conditions for creating a printing task this time, all printing modules are controlled to create the current printing task, when there is a printing module that does not meet the conditions for creating a printing task this time, all the printing modules are controlled to abandon the creation of the current printing task, and then return to step S4331, in this way, it is ensured that each printing module creates a printing task in sequence, and the label printed by each printing module will not be mismatched due to the failure of a certain printing module to create a printing task.

Figure 22:
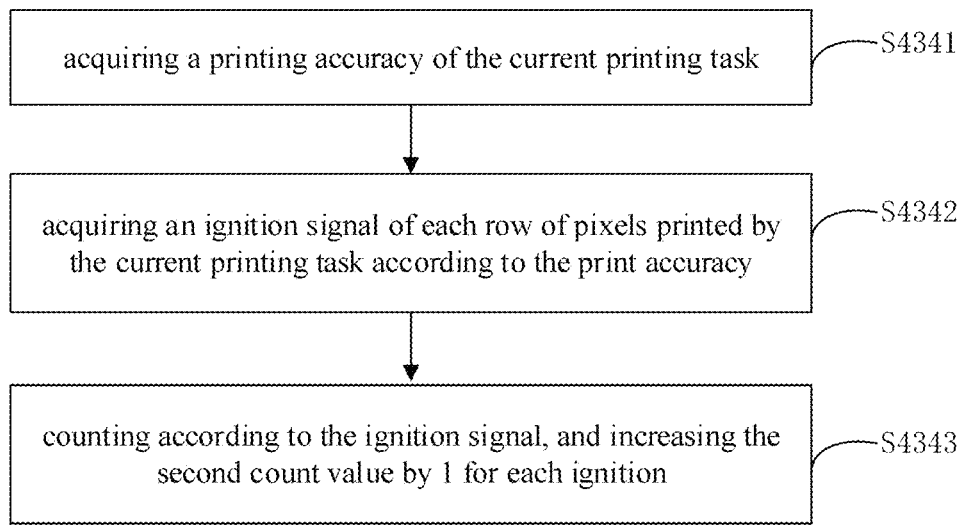
FIG. 22 is a flowchart of a method for acquiring a second count value in the Onepass system inkjet printing control method according to the second embodiment of the present invention.

In an embodiment, referring to FIG. 22, the specific steps for obtaining the second count value of the second counter are as follows:

S4341) acquiring a printing accuracy of the current printing task;

S4342) acquiring an ignition signal of each row of pixels printed by the current printing task according to the print accuracy; and S4343) counting according to the ignition signal, and increasing the second count value by 1 for each ignition.

Specifically, according to the printing accuracy of the current printing task, the ignition signal of each row of pixels is acquired, the second count value of the second counter is increased by 1 every time the ignition occurs, each time the second count value of the second counter is increased by 1, the channel offset values of all logic channels are compared with the second count value, if the logical channel offset value is less than or equal to the second count value, the logical channel executes the current printing task; otherwise, the logical channel does not execute the printing of the current printing task.

S435) comparing whether the channel offset value of each logic channel is less than or equal to the second count value;

specifically, each time the second count value of the second counter is increased by 1, the channel offset values of all logic channels are compared with the second count value, if the offset value of logical channel is less than or equal to the second count value, the logical channel executes the current printing task, otherwise, the logical channel does not execute the printing of current printing task.

S436) when the channel offset value of the logical channel is less than or equal to the second count value, executing the printing of the current printing task by the logical channel, otherwise, not executing the printing of the current printing task by the logical channel;

specifically, when the channel offset value of the logical channel is less than or equal to the second count value, the printing data extracted from the storage medium in units of the logical channel is valid data, then the physical channel corresponding to the logical channel performs inkjet printing according to the valid data;

when the channel offset value of the logical channel is greater than the second count value, the printing data extracted from the storage medium in units of the logical channel is invalid data, then the physical channel corresponding to the logical channel does not discharge ink.

When the channel offset value of the logical channel is greater than the second count value, extracting printing data from a storage medium in units of the logical channel and performing masking processing to obtain invalid data;

the invalid data is stored in a RAM buffer corresponding to the logic channel;

the invalid data is extracted from the RAM buffer to the physical channel for printing according to the mapping relationship, wherein when the printing data is invalid data, the physical channel does not discharge ink during the printing process.

Figure 23:
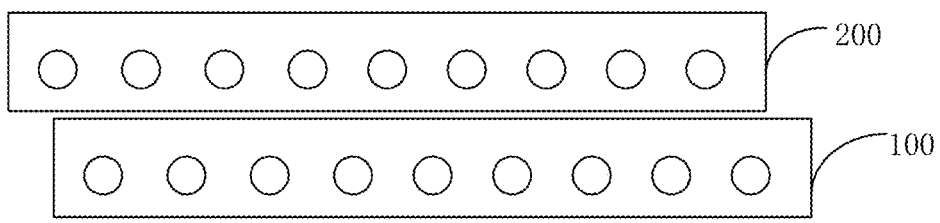
FIG. 23 is a schematic diagram of the nozzle structure in the Onepass system inkjet printing control method according to the second embodiment of the present invention.
Figures 24, 25:
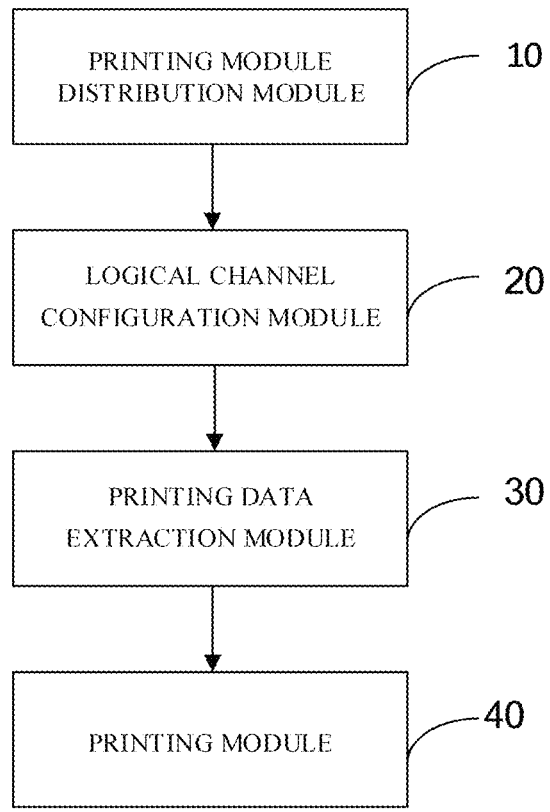
FIG. 24 is a schematic diagram of the data structure in the Onepass system inkjet printing control method according to the second embodiment of the present invention.
FIG. 25 is a schematic diagram of the structure of the Onepass system inkjet printing control device according to the third embodiment of the present invention.

According to the above method, each physical channel can print in alignment, namely print in a straight line, specifically as showing in FIG. 23, it is the inkjet head structure of the Onepass inkjet printer, in this embodiment, one nozzle corresponds to one physical channel, and one physical channel is configured with one logical channel, then the channel offset value of the first inkjet head 100 is 0, and the channel offset value of the second inkjet head 200 is 1, the image data to be printed is shown in FIG. 24, after the creation of the current printing task is completed, the second counter starts counting, the distance of one line of pixels is taken each time the ignition is performed, the second count value of the second counter is increased by 1;

when the count value of the second counter is 0, the first inkjet head 100 starts to print the pixels a0, a2, a4, and a6 of the first row of pixels, and the second inkjet head 200 does not print; when the count value of the second counter is 1, the first inkjet head 100 prints the pixels b0, b2, b4, and b6 of the second row of pixels, the second inkjet head 200 prints pixels a1, a3, a5, and a7 of the first row of pixels; when the count value of the second counter is 3, the first inkjet head 100 prints the pixels c0, c2, c4, and c6 of the third row of pixels, the second inkjet head 200 prints pixels b1, b3, b5, and b7 of the second row of pixels, and so on until the target image is printed. In this way, it can be ensured that the first inkjet head 100 and the second inkjet head 200 can print in alignment, and can print on the same straight line.

S437, repeatedly comparing whether the channel offset value of each logical channel is less than or equal to the second count value, until the printing of the current printing task is completed.

The method uses the first counter to statistically record the blank position, and determines the start printing position by comparing the first count value with the set value of the printing start position, which ensures that the Onepass high-speed printing process accurately records and obtains the information of the initial printing position, then, by creating this printing task, and using the second counter and the offset value of each logical channel to clarify the initial ink ejection time of each channel, it is ensured that the data corresponding to each logical channel can be printed in alignment.

Embodiment 3

Referring to FIG. 25, the present invention provides a Onepass system inkjet printing control device, wherein the device comprises:

a printing module distribution module 10, used for dividing all physical channels into several groups according to a printing requirement command, defining one group as a printing module, wherein each of the printing modules comprises x physical channels, x≥1, x is an integer;

a logical channel configuration module 20, used for configuring n logical channels for each printing module, wherein n≥x, n is an integer;

a printing data extraction module 30, used for starting a printing command, and extracting corresponding printing data from the printing memory in units of the logical channel; and a printing module 40, used for processing the printing data according to the printing parameters and then inputting it into the corresponding physical channel for inkjet printing.

Embodiment 4

Figure 26:
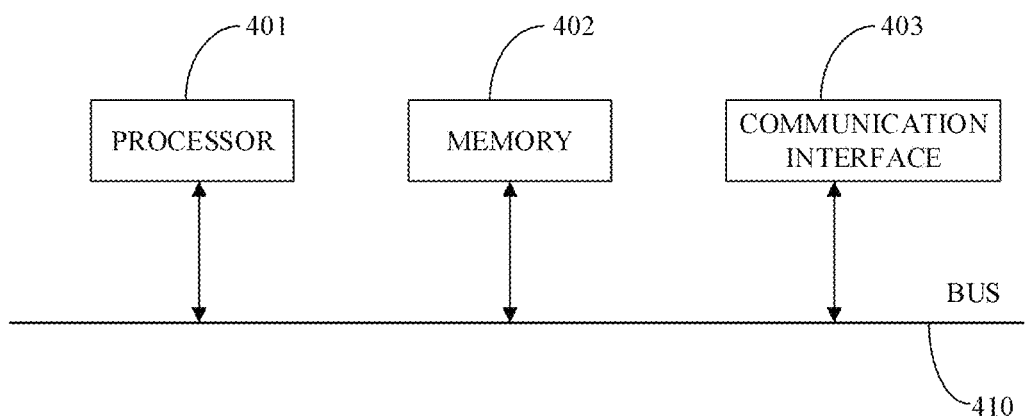
FIG. 26 is a schematic structural diagram of the Onepass system inkjet printing control device according to the fourth embodiment of the present invention.

In addition, the Onepass system inkjet printing control method of the embodiment of the present invention described in conjunction with FIG. 2 may be implemented by the Onepass system inkjet printing control device. The FIG. 26 shows a schematic diagram of the hardware structure of the Onepass system inkjet printing control device provided by an embodiment of the present invention.

The Onepass system inkjet printing control device may comprise a processor 401 and a memory 402 storing computer program instructions.

Specifically, the foregoing processor 401 may include a central processing unit (CPU), or an application specific integrated circuit (ASIC), or may be configured to implement one or more integrated circuits in the embodiments of the present invention.

The memory 402 may comprise a mass storage for data or instructions. By way of example and not limitation, the memory 402 may comprise a hard disk drive (HDD), a floppy disk drive, a flash memory, an optical disk, a magneto-optical disk, a magnetic tape, or a universal serial bus (USB) drive, or a combination of two or more thereof. Where appropriate, the memory 402 may comprise removable or non-removable (or fixed) media. Where appropriate, the memory 402 may be internal or external to the data processing device. In a particular embodiment, the memory 402 is a non-volatile solid state memory. In a particular embodiment, the memory 402 comprises read-only memory (ROM). Where appropriate, the ROM can be mask-programmed ROM, programmable ROM (PROM), erasable PROM (EPROM), electrically erasable PROM (EEPROM), electrically rewritable ROM (EAROM) or flash memory or a combination of two or more thereof.

The processor 401 reads and executes the computer program instructions stored in the memory 402 to implement any one of the Onepass system inkjet printing control methods in the foregoing embodiments.

In an embodiment, the Onepass system inkjet printing control device may further comprise a communication interface 403 and a bus 410, wherein, as shown in FIG. 26, the processor 401, the memory 402, and the communication interface 403 are connected through the bus 410 and complete the communication with each other.

The communication interface 403 is mainly used to implement communication between various modules, devices, units and/or devices in the embodiments of the present application.

The bus 410 comprises hardware, software, or both, and couples the components of the Onepass system inkjet printing control device to each other. By way of example and not limitation, the bus may comprise Accelerated Graphics Port (AGP) or other graphics bus, enhanced industry standard architecture (EISA) bus, front side bus (FSB), Hypertransport (HT) interconnection, Industry Standard Architecture (ISA) bus, Infinite Bandwidth interconnection, Low Pin Count (LPC) bus, memory bus, Microchannel Architecture (MCA) bus, Peripheral Component Interconnect (PCI) bus, PCI-Express (PCI-X) bus, Serial Advanced Technology Attachment (SATA) bus, Video Electronics Standards Association Local (VLB) bus or other suitable bus or a combination of two or more thereof. Where appropriate, the bus 410 may comprise one or more buses. Although the embodiments of the present invention describe and show a specific bus, the present invention considers any suitable bus or interconnection.

Embodiment 5

In yet another embodiment, in combination with the Onepass system inkjet printing control method in the foregoing embodiment, an embodiment of the present application may provide a computer-readable storage medium for implementation. The computer program instructions are stored on the computer-readable storage medium; when the computer program instructions are executed by the processor, any one of the Onepass system inkjet printing control methods in the foregoing embodiments are implemented.

By dividing all physical channels into several groups according to the printing requirements, each group corresponding to a production line, and configuring n logical channels for each printing module, and then using the logical channels as a bridge to extract and process data, the Onepass system inkjet printing control method, device and storage medium provided in the present invention ensure that each printing module can independently control the corresponding printing task and can accurately print on the predetermined position.

It should be clear that the present invention is not limited to the specific configurations and processes described above and shown in the drawing. For simplicity, detailed description of known methods is omitted here. In the above embodiments, several specific steps are described and shown as examples. However, the method of the present invention is not limited to the specific steps described and shown. Those skilled in the art can make various changes, modifications and additions, or change the order between the steps within the spirit of the present invention.

What mentioned above are only embodiments of the present invention, those skilled in the art can clearly understand that, for the convenience and conciseness of description, the specific working processes of the systems, modules, and units described above can refer to the corresponding processes in the foregoing method embodiments, which will not be repeated here. Any equivalent structure or equivalent transformation of the procedure made with the specification and pictures attached of the present invention, or directly or indirectly using the specification and pictures attached of the present invention into other relevant technical fields, is comprised in the scope of the patent protection of the present invention.

What is claimed is:

1. An Onepass system inkjet printing control method, comprising steps of:
    dividing all physical channels into several groups according to a printing requirement command, defining the several groups as printing modules, wherein each of the printing modules comprises x physical channels, x≥1, x is an integer;
    configuring n logical channels for the printing modules, wherein n≥x, n is an integer;
    starting a printing command, and extracting corresponding printing data from a printing memory in units of the logical channels; and
    processing the printing data according to printing parameters and then inputting processed printing data into a corresponding physical channel for inkjet printing;
    wherein each of the physical channels corresponds to an inkjet head or y rows of nozzles on a corresponding inkjet head, y≥1, and the printing parameters are generated according to the printing requirement command and characteristics of a printing device.

2. The Onepass system inkjet printing control method as defined in claim 1, wherein the printing requirement command further comprises a command for a number of copies of a product to be printed;
    after configuring n logical channels for the printing modules, the method further comprises steps of:
    according to the command for the number of copies of the product to be printed, generating a printing task queue, wherein one of the printing modules corresponds to one printing task queue;
    acquiring target printing tasks and printing parameters from the printing task queue corresponding to each of the printing modules;
    storing the target printing tasks of each of the printing modules into corresponding storage areas in a task processing buffer; and
    establishing a mapping relationship among the physical channels, the logical channels, the printing modules, and the storage areas according to the printing requirement command.

3. The Onepass system inkjet printing control method as defined in claim 2, wherein the step of starting the printing command further comprises steps of:
    starting the printing command, extracting the target printing task corresponding to each of the printing modules; and
    calculating a storage address of the printing data corresponding to a logical channel of a current ignition according to the printing parameters of the target printing task, and extracting the corresponding printing data from the printing memory according to the storage address.

4. The Onepass system inkjet printing control method as defined in claim 3, wherein the step of extracting the corresponding printing data from the printing memory further comprises steps of:
    acquiring a logical channel number and a logical channel parameter of the logical channel of the current ignition;
    acquiring a printing task number of the target printing task, and acquiring a task parameter corresponding to the target printing task and a printing position of the target printing task according to the printing task number;
    acquiring a storage address and a printing parameter of channel data corresponding to the logical channel according to the logical channel parameter, the task parameter corresponding to the target printing task, and the printing position; and
    extracting the channel data from the printing memory according to the storage address, and processing the channel data and the printing parameter to obtain the printing data.

5. The Onepass system inkjet printing control method as defined in claim 4, wherein the step of acquiring the storage address and the printing parameter of the channel data corresponding to the logical channel further comprises steps of:
    acquiring an actual storage address of the channel data corresponding to the logical channel according to the logical channel parameter;
    determining a requirement reading address of the channel data corresponding to the logical channel according to the task parameter and a memory addressing requirement of the target printing task;
    determining invalid data in the channel data to be read according to the actual storage address and the requirement reading address; and
    reading the channel data, removing the invalid data and writing the channel data into a data buffer.

6. The Onepass system inkjet printing control method as defined in claim 1, wherein the step of configuring n logical channels comprises steps of:
    confirming shared physical channels and dedicated physical channels among all the physical channels according to printing requirements, wherein the shared physical channel belongs to y printing modules, and the dedicated physical channel belongs to only one printing module, y≥2, y is an integer; and
    configuring m logical channels for each of the shared physical channels, configuring z logical channels for each of the dedicated physical channels, wherein m≥y, z≥1, m and z are integers.

7. The Onepass system inkjet printing control method as defined in claim 6, wherein the step of processing the printing data according to the printing parameters and then inputting the processed printing data into the corresponding physical channel for inkjet printing further comprises steps of:
   merging the printing data corresponding to all the logical channels in each of the shared physical channels according to the printing parameters, and then processing and inputting the printing data into the shared physical channels for ejecting ink; and
   directly processing the printing data corresponding to a logical channel of each of the dedicated physical channels and inputting the printing data into the dedicated physical channels for inkjet printing according to the printing parameters.

8. The Onepass system inkjet printing control method as defined in claim 1, further comprising steps of: setting "a" label images in a variable image, wherein "a" is an integer and a≥1, and the "a" label images are distributed in different positions of a background image according to a predetermined typesetting rule, the step of dividing all the physical channels into the several groups according to the printing requirement command comprises steps of:
   determining a physical channel for printing each of the label images according to the printing requirement command, defining all the physical channels corresponding to one label image as a label module, wherein the label module comprises x1 physical channels, x1 is an integer and x1≥1; and
   determining a physical channel for printing the background image according to the printing requirement command, defining all the physical channels corresponding to the background image as a background module, wherein the background module comprises x2 physical channels, x2 is an integer and x2≥x1.

9. The Onepass system inkjet printing control method as defined in claim 8, wherein the printing requirement command comprises: a printing start command and a task parameter, the printing start command comprises a command for a number of copies of the variable image to be printed and a command for selecting the background image, the task parameter is obtained according to the predetermined typesetting rule, and the task parameter comprises: a width of each of the label images and the background image along a direction in which the inkjet heads are arranged.

10. The Onepass system inkjet printing control method as defined in claim 9, further comprising steps of:
   configuring x1 logical channels for each of the label modules, wherein one logical channel in each of the label modules corresponds to one physical channel in the label modules;
   configuring x2 logical channels for the background module, wherein one logical channel in the background module corresponds to one physical channel in the background module; and
   establishing a mapping relationship between the physical channels, the logical channels, and the printing modules.

11. The Onepass system inkjet printing control method as defined in claim 10, further comprising steps of:
   respectively acquiring background image data and label image data required for current printing in units of one logical channel;
   merging the background image data of the logical channel corresponding to a same physical channel and the label image data required for the current printing according to the mapping relationship; and
   subjecting merged background image data and label image data to inkjet printing.

12. The Onepass system inkjet printing control method as defined in claim 9, further comprising steps of:
   acquiring a printing trigger signal of the background module, and judging whether the printing task queue corresponding to the background module and all the label modules are empty according to the printing trigger signal;
   when the printing task queue corresponding to the background module and all the label modules are not empty, determining whether the task parameter of a current printing task in each printing task queue are read incorrectly; and
   when the task parameter of the background module and all the label modules are correctly read, controlling the background module and all the label modules to simultaneously create the current printing task.

13. The Onepass system inkjet printing control method as defined in claim 12, wherein the printing task queue of the background module comprises a starting address of the background image data in a memory, and s number of times the background image needs to be repeatedly printed; the printing task queue of each of the label modules comprises a starting address of the label image data acquired each time in the memory and a data length of each printing task.

14. The Onepass system inkjet printing control method as defined in claim 1, wherein the step of processing the printing data according to the printing parameters and then inputting the processed printing data into the corresponding physical channel for inkjet printing comprises steps of:
   acquiring a first count value after counting a movement distance of a print medium;
   comparing whether the first count value is equal to a set value of a printing start position;
   when the first count value is less than the set value of the printing start position, continuing to count the movement distance of the print medium until the first count value is equal to the set value of the printing start position;
   acquiring a second count value after counting a number of print lines of the current printing task;
   comparing whether a channel offset value of each logical channel is less than or equal to the second count value;
   when the channel offset value of the logical channel is less than or equal to the second count value, executing printing of the current printing task by the logical channel, otherwise, not executing the printing of the current printing task by the logical channel; and
   repeatedly comparing whether the channel offset value of each logical channel is less than or equal to the second count value, until the printing of the current printing task is completed.

15. The Onepass system inkjet printing control method as defined in claim 14, wherein the step of when the channel offset value of the logical channel is less than or equal to the second count value, executing the printing of the current printing task by the logical channel, otherwise, not executing the printing of the current printing task by the logical channel comprises steps of:
   when the channel offset value of the logical channel is less than or equal to the second count value, the printing data extracted from a storage medium in units of the logical channel is valid data, then the physical channel corresponding to the logical channel performs inkjet printing according to the valid data; and when the channel offset value of the logical channel is greater than the second count value, the printing data extracted from the storage medium in units of the logical channel is invalid data, then the physical channel corresponding to the logical channel does not eject ink.

16. The Onepass system inkjet printing control method as defined in claim 15, further comprising steps of:

acquiring an actual arrangement rule of the physical channels in the current printing task;

calculating to obtain offset values of each physical channel according to the actual arrangement rule; and acquiring the channel offset value corresponding to each logical channel according to the mapping relationship, wherein the channel offset values of all the logical channels corresponding to one physical channel are the same and equal to the offset value of the physical channel.

17. The Onepass system inkjet printing control method as defined in claim 16, wherein the step of acquiring a second count value after counting a number of print lines of the current printing task further comprises steps of:

acquiring a printing accuracy of the current printing task;

acquiring an ignition signal of each row of pixels printed by the current printing task according to the print accuracy; and counting according to the ignition signal, and increasing the second count value by 1 for each ignition.

18. The Onepass system inkjet printing control method as defined in claim 14, further comprising steps of:

when the channel offset value of the logical channel is greater than the second count value, extracting printing data from a storage medium in units of the logical channel and performing shielding processing to obtain invalid data;

storing the invalid data in a RAM buffer corresponding to the logical channel; and according to a mapping relationship, extracting the invalid data from the RAM buffer to the physical channel for printing, wherein when the printing data is invalid data, the physical channel does not eject ink during the printing process.

19. The Onepass system inkjet printing control method as defined in claim 17, wherein the step of comparing whether the first count value is equal to the set value of the printing start position further comprises steps of:

calculating to obtain the set value of the printing start position according to the printing accuracy and a margin distance parameter;

calculating to obtain a counting signal according to the printing accuracy; and counting according to the counting signal, then increasing the first count value by 1 each time the counting signal is generated.

20. A Onepass system inkjet printing control device, comprising:

at least one processor, at least one memory, and computer program instructions stored in a memory, which implement the method as defined in claim 1 when the computer program instructions are executed by the processor.

21. A non-transitory storage medium having computer program instructions stored thereon, wherein the method as defined in claim 1 is implemented when the computer program instructions are executed by a processor.

* * * * *